(12) United States Patent
Ueda et al.

(10) Patent No.: US 6,753,665 B2
(45) Date of Patent: Jun. 22, 2004

(54) LINEAR COMPRESSOR DRIVE DEVICE

(75) Inventors: Mitsuo Ueda, Nishinomiya (JP); Kaneharu Yoshioka, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/333,268

(22) PCT Filed: May 20, 2002

(86) PCT No.: PCT/JP02/04836
§ 371 (c)(1),
(2), (4) Date: Apr. 22, 2003

(87) PCT Pub. No.: WO02/095923

PCT Pub. Date: Nov. 28, 2002

(65) Prior Publication Data

US 2003/0164691 A1 Sep. 4, 2003

(30) Foreign Application Priority Data

May 18, 2001 (JP) ..................... 2001-149777

(51) Int. Cl.⁷ ............................... F04B 49/06
(52) U.S. Cl. .................. 318/135; 417/44.11; 417/44.45
(58) Field of Search .................... 310/12, 14, 15, 310/17, 19; 318/119, 122, 126, 135; 417/44.1, 45, 44.11, 415–419; 363/95, 40

(56) References Cited

U.S. PATENT DOCUMENTS

| | | | |
|---|---|---|---|
| 5,342,176 A | 8/1994 | Redlich | 318/687 |
| 5,342,576 A | 8/1994 | Whitehead | 417/212 |
| 5,897,296 A * | 4/1999 | Yamamoto et al. | 417/44.1 |
| 5,947,693 A * | 9/1999 | Yang | 417/45 |
| 5,980,211 A * | 11/1999 | Tojo et al. | 417/45 |
| 6,437,524 B1 * | 8/2002 | Dimanstein | 318/135 |
| 6,501,240 B2 * | 12/2002 | Ueda et al. | 318/135 |

FOREIGN PATENT DOCUMENTS

| | | | |
|---|---|---|---|
| JP | 9-112438 | 5/1997 | F04B/49/06 |
| JP | 9-126147 | 5/1997 | F04B/49/06 |

* cited by examiner

*Primary Examiner*—Burton Mullins
(74) *Attorney, Agent, or Firm*—Wenderoth, Lind & Ponack, L.L.P.

(57) ABSTRACT

A linear compressor driving apparatus having an inverter which supplies a driving current of a predetermined frequency to a linear compressor. The linear compressor driving apparatus further includes an inverter controller for controlling the inverter on the basis of resonance frequency information so that the frequency of an output current from the inverter becomes equal to the resonance frequency, and instantaneous values of an output current and an output voltage from the inverter are measured at a phase timing in which an amount of change in the output current of the inverter becomes zero. A piston stroke is calculated from these measured values. In such a linear compressor driving apparatus, a stroke and a top clearance of the piston of the linear compressor can be accurately detected by relatively simple arithmetic processing without using a position sensor.

26 Claims, 9 Drawing Sheets

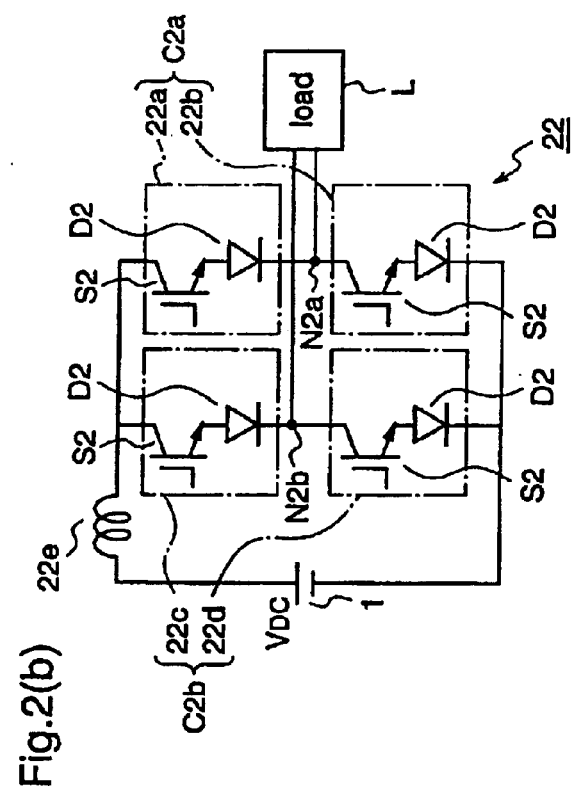
Fig.2(b)
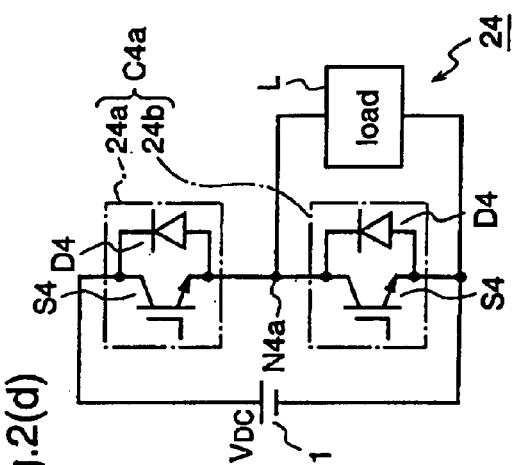
Fig.2(d)
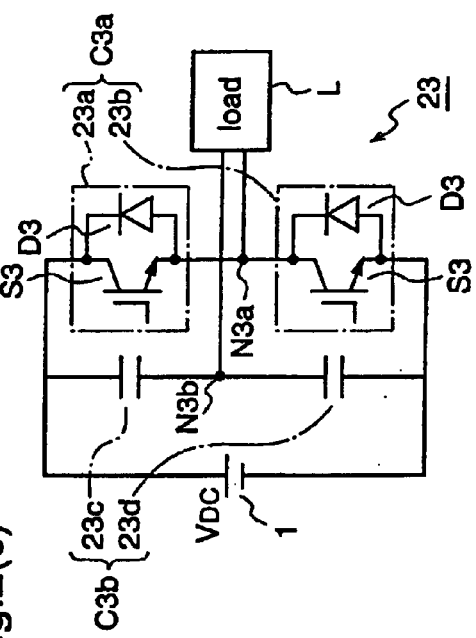
Fig.2(c)
Fig.2(a)

LINEAR COMPRESSOR DRIVE DEVICE

TECHNICAL FIELD

The present invention relates to a linear compressor driving apparatus and, more particularly, to an apparatus for driving a linear compressor which generates a compressed gas in a cylinder by making a piston reciprocate with a linear motor.

BACKGROUND ART

A linear compressor utilizing a mechanical elastic member or elasticity of a gas has conventionally been known as an apparatus for generating a compressed gas.

FIG. 7 is a cross-sectional view for explaining a conventional linear compressor, and illustrates a concrete configuration of a linear compressor using a spring as an elastic member.

A linear compressor 100 has a cabinet 71 comprising a cylinder section 71a and a motor section 71b which are adjacent to each other. The cylinder section 71a of the cabinet 71 forms a cylindrical-shaped cylinder of the linear compressor 100. In the cylinder section 71a, a piston 72 is provided slidably along a direction parallel to a center axis of the cylinder (the piston axis direction).

On the back of the piston 72 in the cabinet 71, a piston rod 72a is placed in the cylinder section 71a and the motor section 71b, and an end of the piston rod 72a is fixed to the piston 72. Further, a support spring (resonance spring) 81 is placed between the other end of the piston rod 72a and an inner wall 71b1 of the motor section 71b which is opposed to the piston rod 72a. The support spring 81 deforms when the piston 72 is displaced from a piston neutral position (piston reference position), and, when the support spring 81 is deformed, the support spring 81 applies a force to the piston 72 so that the piston 72 returns to the piston reference position. Further, the piston neutral position is a piston position where the support spring 81 is not deformed, and no force is applied from the support spring 81 to the piston 72 when the piston 72 is located in the piston neutral position.

Further, a magnet 73 is fixed to a portion of the piston rod 72a, which portion is located in the motor section 71b, and an electromagnet 74 comprising an outer yoke 74a and a stator coil 74b, embedded in the outer yoke 74a is fixed to a portion of the inner wall of the motor section 71b, which portion is opposed to the magnet 73.

A linear motor 82 is constituted by the electromagnet 74 and the magnet 73. That is, in the linear compressor 100, the piston 72 reciprocates along its axis direction by the driving force of the linear motor 82, i.e., the electromagnetic force generated between the electromagnet 74 and the magnet 73, and the elasticity of the support spring 81.

On the other hand, a compression chamber 76, which is a closed space surrounded by a cylinder upper portion inner wall 75, a piston compression wall 72b, and a cylinder peripheral wall 77, is formed at the cylinder head side of the cabinet 71. An end of a cooling medium inlet tube 1a for drawing a low-pressure cooling medium gas into the compression chamber 76 is opened at the cylinder upper portion inner wall 75 and, further, an end of a tooling medium discharge tube 1b for discharging a high-pressure cooling medium gas from the compression chamber 76 is opened at the cylinder upper portion inner wall 75. An inlet valve 79 and a discharge valve 80 for preventing a back flow of the cooling medium gas are fixed to the cooling medium inlet tube 1a and the cooling medium discharge tube 1b, respectively.

In the linear compressor 100 having the above-described structure, the piston 72 reciprocates in its axis direction by an intermittent supply of a driving current from a motor driver (not shown) to the linear motor 82, whereby drawing of the low-pressure cooling medium gas into the compression chamber 76, compression of the cooling medium gas in the compression chamber 76, and discharge of the compressed high-pressure cooling medium gas from the compression chamber 76 are repeatedly carried out.

By the way, in the above-mentioned linear compressor 100, even when a current or voltage applied to the linear motor 82 is kept at a constant value, if the state of the load applied onto the linear compressor changes, the stroke of the piston 72 changes. Therefore, especially in a refrigeration compressor using the linear compressor 100, since the thermodynamic efficiency of a refrigerating cycle is significantly improved by controlling the flow of the cooling medium according to the varying environmental temperature, a means for detecting the stroke of the piston 72 that determines the flow of cooling medium (piston stroke detection means) is needed.

Further, in the linear compressor 100, from its structural viewpoint, there is a danger in that the front end of the piston might collide with the upper wall of the cylinder.

To be specific, the piston 72 receives not only the piston driving force of the linear motor 82 and the elasticity of the support spring 81 but also a force caused by a differential pressure between the pressure of the cooling medium gas in the compression chamber 76 and the back pressure of the piston 72, whereby the center position of the reciprocating motion of the piston 72 (hereinafter also referred to as piston amplitude center position) is offset with respect to the piston amplitude center position when the differential pressure is zero, i.e., the piston position when the support spring is not deformed (piston neutral position). Therefore, when the internal pressure of the compression chamber 76 that acts on the piston 72 is increased/decreased due to a change of the load state, not only the stroke of the piston 72 but also the center position of the reciprocating motion of the piston 72 might change.

In order to prevent collision of the piston with the cylinder, not only the stroke detection means but also a position detection means for detecting the distance between the front end of the piston and the inner wall of the cylinder head are required. For example, in a linear compressor having no collision prevention means, the front end of the piston hits the inner wall of the cylinder head, resulting in uncomfortable noise or damage to the piston or the cylinder.

There is employed, as the above-mentioned position detection means, a sensor which can detect the degree of displacement of the piston (piston displacement) with respect to the piston reference position such as the piston neutral position, without contacting the movable members such as the piston in the linear compressor 100. For example, a displacement meter using an eddy current system, a displacement meter using a differential transformer, and the like are employed.

However, when such sensor is used, the production cost of the linear compressor 100 is increased and, moreover, a space for mounting the sensor is needed, which leads to an increase in the size of the cabinet 71 of the linear compressor 100. Further, since the sensor is used while being exposed to a high-temperature and high-pressure gas in the compressor 100, there occurs a problem with then reliability of the sensor itself, in other words, a problem in that a sensor which can be reliably used under a high-temperature and high-pressure atmosphere is desired.

So, as a method for detecting the position of the piston 72, there is proposed a method of directly measuring the linear motor driving current and voltage which are supplied to the linear compressor 100, and deriving the position of the piston 72 on the basis of the measured values without using a position sensor placed in the linear compressor 100 (refer to Japanese Unexamined Patent Publication No. Hei. 8-508558).

Hereinafter, a description will be given of a piston position detection method used for a linear compressor, which is described in the above-mentioned literature.

FIG. 8 is a diagram illustrating an equivalent circuit of a linear motor for driving a piston of a linear compressor.

In FIG. 8, L indicates an equivalent inductance [H] of a coil as a component of the linear motor, and R indicates an equivalent resistance [Ω] of the coil. Further, V indicates an instantaneous voltage [V] applied to the linear motor, and I indicates a current [A] applied to the linear compressor. Further, αxv indicates an induced electromotive voltage [V] which is generated when the linear motor is driven, wherein α is a thrust constant [N/A] of the linear motor, and v is an instantaneous velocity [m/s] of the linear motor.

The thrust constant α of the linear motor indicates a force [N] which is generated when a unit current [A] is passed through the linear motor. Although the unit of the thrust constant α is expressed by [N/A], this unit is equivalent to [Wb/m] or [V·s/m].

The equivalent circuit shown in FIG. 8 is derived from the Kirchhoff's law, and an instantaneous velocity v [m/s] of the linear motor is obtained from the equivalent circuit.

That is, under the driving state of the linear motor, the voltage (V) applied to the linear motor is balanced with the sum of a dropped voltage (I×R) [V] due to the equivalent resistance of the coil of the linear motor, a dropped voltage (L·dI/dt) [V] due to the equivalent inductance of the coil, and the induced electromotive voltage (α×v) [V] that is generated when driving the linear motor, and the following formula (1) holds.

$$v = \frac{1}{\alpha}\left(V - R \times I - L\frac{dI}{dt}\right) \quad (1)$$

The coefficients α[N/A], R[Ω], and L[H] used in formula (1) are constants unique to the motor, and these constants are already-known values. Accordingly, the instantaneous velocity v[m/s] can be obtained from these constants and the applied voltage V[V] and current I[A], which are measured, on the basis of formula (1).

Further, a piston displacement (a distance from an undefined reference position to the piston) x[m] is obtained by a time integration of the instantaneous velocity v[m/s] as represented by the following formula (2). In formula (2), the constant Const. is the piston displacement at the start of integration.

$$x = \int v \, dt + \text{Const.} \quad (2)$$

As described above, in the piston position detection method disclosed in the above-described literature, the measured values V and I of the applied voltage and current to the linear motor are subjected to arithmetic processing including differentiation based on formula (1) to obtain the instantaneous velocity v of the piston, and further, the instantaneous velocity v is subjected to arithmetic processing including integration based on formula (2), whereby the piston displacement x can be calculated.

However, the piston displacement x obtained by the arithmetic processing based on formulae (1) and (2) is a displacement with reference to a certain position on the piston axis, and a distance from the cylinder head to the piston top dead point position cannot be obtained directly from the displacement x.

To be specific, when the linear compressor 100 is under a loaded condition, the piston center position (piston amplitude center position) in the piston reciprocating motion is offset with respect to the piston neutral position (i.e., the piston amplitude center position when the pressure in the compression chamber is equal to the back pressure) by the pressure of the cooling medium gas, and the piston reciprocates around the offset piston amplitude center position. In other words, the piston displacement x obtained by formula (2) includes an average component.

However, every actual analog integrator or digital integrator does not perform ideal integration processing for outputting a perfect response signal with respect to a constant or a DC input, but it is restricted in responding to a DC input. Therefore, an actual integrator cannot subject the piston displacement x to integration processing in which its average component is reflected. The reason why the DC response of the actual integrator is restricted is because the output of the integrator should be prevented from being saturated by an unavoidable DC component in the input signal.

As a result, the piston displacement x[m] obtained by the integration processing based on formula (2) using an actual integrator is not a displacement from which an actual distance between the piston and the cylinder head can be directly obtained, but a displacement simply indicating the piston position with reference to a certain point on the piston axis.

Therefore, the piston displacement x[m] obtained from formula (2) is converted into a piston displacement x' indicating the piston position with respect to the piston amplitude center position. Further, using the converted piston displacement x', arithmetic processing for obtaining a piston displacement x" with reference to the cylinder head and indicating the piston amplitude center position is carried out.

Hereinafter, these arithmetic processings will be described in detail.

FIG. 9 is a diagram schematically illustrating the piston position in the cylinder.

Initially, the three coordinate systems shown in FIG. 9, i.e., a first coordinate system X, a second coordinate system X', and a third coordinate system X", will be briefly described.

The first coordinate system X is a coordinate system expressing the piston displacement x, and the first coordinate system X has, as an origin (x=0), a certain point Paru on the piston axis. Accordingly, the absolute value of the displacement x indicates the distance from the point Paru to the piston front end position P.

The second coordinate system X' is a coordinate system expressing the piston displacement x', and the second coordinate system X' has, as an origin (x'=0), the piston amplitude center position Pav. Accordingly, the absolute value of the displacement x' indicates the distance from the amplitude center position Pav to the piston front end position P.

The third coordinate system X" is a coordinate system expressing the piston displacement x", and the third coordinate system X" has, as an origin (x"=0), the cylinder head position Psh on the piston axis. Accordingly, the absolute value of the displacement x" indicates the distance from the cylinder head position Psh to the piston front end position P.

Next, an arithmetic operation for obtaining the piston displacement x" will be described.

A piston position (piston top dead point position) Ptd in which the piston is closest to the cylinder head 75 is indicated by a displacement xtd on the first coordinate system X, and a piston position (piston bottom dead point position) Pbd in which the piston is farthest from the cylinder head 75 is indicated by a displacement xbd on the first coordinate system X. Then, a piston stroke Lps[m] is obtained from a difference between the displacement xtd corresponding to the piston top dead point position Ptd on the first coordinate system X and the displacement xbd corresponding to the piston bottom dead point position Pbd on the first coordinate system X.

Further, the piston amplitude center position Pav in the state where the piston is reciprocating is a position which is apart from the displacement xtd of the piston position (piston top dead point position) Ptd in which the piston is closest to the cylinder head by a length (Lps/2) that is equal to half the piston stroke Lps[m] from the cylinder head. Accordingly, the piston amplitude center position Pav is expressed by a displacement xav (=(xbd−xtd)/2) on the first coordinate system X.

Further, when the constant Const. in formula (2) is zero, a new function that indicates the piston position P by the piston displacement x'[m] is derived with the piston amplitude center position Pav as a reference (origin), in other words, on the second coordinate system X'.

Next, a description will be given of a method for obtaining the piston displacement x" indicating the piston amplitude center position on the third coordinate system X" with the cylinder head position Psh as an origin.

Under the state where the linear compressor 100 draws in the cooling medium gas (inlet state), i.e., under the state where the inlet valve is open, both the pressure in the compression chamber and the pressure on the back of the piston are equal to the cooling medium gas inlet pressure. This is because the linear compressor 100 is constructed so that the differential pressure becomes 0 under the state where the inlet valve is open. In this state, a force from the pressure of the cooling medium gas onto the piston can be ignored. That is, in this state, the forces acting on the piston are only the repulsive force of the spring that is generated by the bending (deformation) of the support spring 81, and the electromagnetic force that is generated by applying a current to the linear motor. According to the Newton's law of motion, the sum of these forces is equal to the product of the total mass of the movable member that is moving and its acceleration.

Accordingly, under this state, the following formula (3) holds as an equation of motion relating to the movable member.

$$m = a = \alpha \times I - k(x' + xav'' - xini'') \quad (3)$$

In formula (3), m is the total mass [kg] of the movable member that is reciprocating, a is the instantaneous acceleration [m/s$^2$] of the movable member, and k is the spring constant [N/m] of the support spring that is incorporated in the linear compressor. Further, xav" is the above-mentioned displacement on the third coordinate system X", which indicates the piston amplitude center position, and the absolute value of this displacement xav" expresses the distance from the cylinder head position Psh to the piston amplitude center position pav. Further, xini" is the displacement on the third coordinate system X", which indicates the piston neutral position Pini, and the absolute value of this displacement xini" expresses the distance [m] between the piston neutral position (the position of the piston in the state where the support spring is not deformed) Pini and the cylinder head position Psh.

The instantaneous acceleration a[m/s$^2$] is obtained as shown in the following formula (4) by differentiating the instantaneous velocity v[m/s] expressed by formula (1).

$$a = \frac{dv}{dt} \quad (4)$$

Furthermore, the displacement x'[m] on the second coordinate system X', which indicates the distance from the piston amplitude center position Pav to the piston front end position P, is obtained by setting the constant Const. in formula (2) at 0.

Furthermore, the total mass m[kg] of the movable member, the spring constant k[N/m] of the support spring, and the displacement xini" on the third coordinate system X", which indicates the distance from the cylinder head position Psh to the piston neutral position Pini, are already known values, and the driving current I may be the measured value.

Accordingly, the displacement xav" on the third coordinate system X", which indicates the distance from the cylinder head position Psh to the piston amplitude center position Pav, can be calculated using formula (3).

Further, the displacement xtd"[m] on the third coordinate system X", which indicates the top dead point position of the piston (the position where the piston is closest to the cylinder head), can be obtained as a displacement in a position which is apart from the displacement xav" on the third coordinate system X" obtained by formula (3) (the distance from the cylinder head position Psh to the piston amplitude center position Pav) by a distance that is equal to half of (Lps/2) the already-obtained piston stroke length Lps[m] toward the cylinder head.

In this way, the piston stroke length Lps[m] and the displacement xtd"[m] on the third coordinate system X", which indicates the piston top dead point position Ptd as a distance from the cylinder head position Psh, are calculated from the current I and voltage V which are applied to the linear compressor.

However, in the piston position detection method of the conventional linear compressor 100, since the piston displacement x', which relatively indicates the piston position P with reference to the piston amplitude center position Pav, is calculated using the integrator and the differentiator, it is not possible to detect the piston position with high accuracy. That is, when the actual integrator and differentiator are constituted by analog circuits, ideal operations cannot be expected because of variations in parts, variations in characteristics due to temperature, and the like. On the other hand, when the integrator and differentiator are constituted by digital circuits, ideal operations cannot be expected because of the absence of data in sampling and holding.

Furthermore, when the piston position detecting circuit in the linear compressor is constituted by digital circuits, it is conceivable that the measuring cycle of the current I and the voltage V applied to the linear compressor may be reduced to increase the position detection accuracy. However, when the measuring cycle is reduced, the calculation cycle is also reduced, whereby the arithmetic load in the digital circuit is increased. Accordingly, when the measuring cycle is reduced, the performance of the microcomputer constituting the digital arithmetic circuit must be enhanced.

The present invention is made to solve the above-described problems and its object is to provide a linear compressor driving apparatus which can detect the position of a piston with high accuracy, on the basis of measured values of a driving current and a driving voltage applied to a linear compressor, without increasing loads of arithmetic processing using these measured values.

SUMMARY OF THE INVENTION

A linear compressor driving apparatus according to a first aspect of the present invention is a linear compressor driving apparatus for driving a linear compressor which has a piston and a linear motor for making the piston reciprocate and which generates a compressed gas by the reciprocating motion of the piston with an AC voltage being applied to the linear motor. The linear compressor apparatus according to the first aspect of the present invention comprises: an inverter for outputting an AC voltage and an AC current to the linear motor; a resonance frequency information output means for outputting resonance frequency information which indicates a resonance frequency of the reciprocating motion of the piston; a voltage detection means for detecting an output voltage of the inverter to output a voltage detection signal; a current detection means for detecting an output current of the inverter to output a current detection signal; an inverter controller for controlling the inverter on the basis of the resonance frequency information so that the inverter outputs, as an output voltage and output current, a sinusoidal-wave-shaped voltage and a sinusoidal-wave-shaped current whose frequencies match the resonance frequency of the piston reciprocating motion, respectively; a timing detection means for detecting, as a specific phase timing, a phase timing at which a differentiated value of the output current of the inverter becomes zero; and a piston velocity calculation means for receiving the voltage detection signal and the current detection signal, and calculating a maximum amplitude of a piston velocity in the piston reciprocating motion on the basis of instantaneous values of the output voltage and the output current from the inverter at the specific phase timing.

According to a second aspect of the present invention, in accordance with the linear compressor driving apparatus of the first aspect, the timing detection means detects, as the specific phase timing, a phase timing at which the amplitude of the output current from the inverter becomes maximum.

According to a third aspect of the present invention, in accordance with the linear compressor driving apparatus of the first aspect, the timing detection means detects a phase timing at which the phase of the output AC current from the inverter becomes at least one of 90° and 270°, as the specific phase timing, on the basis of the current detection signal.

According to a fourth aspect of the present invention, in accordance with the linear compressor driving apparatus of the third aspect, the inverter is provided with an inverter controller for outputting an inverter driving control signal which drives and controls the inverter; and the timing detection means detects a phase timing at which a differentiated value of the output current from the inverter becomes zero on the basis of the phase of the inverter driving control signal.

According to a fifth aspect of the present invention, in accordance with the linear compressor driving apparatus of the fourth aspect, the timing detection means has a phase shift amount detector for detecting the amount of phase shift of the phase of the inverter driving control signal from the phase of the output current of the inverter, and detects a phase timing at which a differentiated value of the output current of the inverter becomes zero, on the basis of the inverter driving control signal whose phase is corrected so that the amount of phase shift becomes zero.

According to a sixth aspect of the present invention, in the linear compressor driving apparatus of the first apparatus, the piston velocity calculation means performs a temperature correction process on a thrust constant of the linear motor, whose value varies with variations in temperature, and calculates a maximum amplitude of the piston velocity on the basis of the temperature-corrected thrust constant, the instantaneous current value, the instantaneous voltage value, and an internal resistance value of the linear motor.

According to a seventh aspect of the present invention, in accordance with the linear compressor driving apparatus of the first aspect, the piston velocity calculation means performs a temperature correction process on an internal resistance value of the linear motor, whose value varies with variations in temperature, and calculates a maximum amplitude of the piston velocity on the basis of the temperature-corrected internal resistance value, the instantaneous values of the output voltage and output current of the inverter, and a thrust constant of the linear motor.

According to an eighth aspect of the present invention, in accordance with the linear compressor driving apparatus of the first aspect, the piston velocity calculation means repeats a velocity calculation process for calculating a maximum amplitude of the piston velocity, and in each of the repeated velocity calculation processes, the piston velocity calculation means corrects a thrust constant of the linear motor, whose value varies with variations in the piston velocity, on the basis of a maximum amplitude of the piston velocity which is calculated in a previous velocity calculation process, and calculates a maximum amplitude of the piston velocity on the basis of the corrected thrust constant.

According to a ninth aspect of the present invention, the linear compressor driving apparatus of the first aspect further includes a stroke information calculation means for calculating piston stroke information which indicates a maximum amplitude of a piston displacement in the piston reciprocating motion on the basis of the output voltage of the inverter and the frequency of the output current of the inverter, which are determined by the inverter controller, and the maximum amplitude of the piston velocity that is calculated by the piston velocity calculation means.

According to a tenth aspect of the present invention, the linear compressor driving apparatus of the first aspect further includes a bottom dead point position information calculation means for calculating bottom dead point position information which indicates a piston bottom dead point position in the piston reciprocating motion on the basis of the output voltage of the inverter and the frequency of the output current of the inverter, which are determined by the inverter controller, and the maximum amplitude of the piston velocity that is calculated by the piston velocity calculation means.

According to an eleventh aspect of the present invention, the linear compressor driving apparatus of the ninth aspect further includes: a bottom dead point position information calculation means for calculating bottom dead point position information which indicates a piston bottom dead point position in the piston reciprocating motion on the basis of the output voltage of the inverter and the frequency of the output current of the inverter, which are determined by the inverter controller, and the maximum amplitude of the piston velocity that is calculated by the piston velocity calculation means; and an arithmetic means for calculating center position information which indicates a piston center position in the piston reciprocating motion by performing the four fundamental rules of arithmetic on the basis of the bottom dead point position information and the piston stroke information.

According to a twelfth aspect of the present invention, the linear compressor driving apparatus of the ninth aspect further includes: a bottom dead point position information calculation means for calculating bottom dead point position information which indicates a piston bottom dead point position in the piston reciprocating motion, on the basis of the output voltage of the inverter and the frequency of the output current of the inverter, which are determined by the inverter controller, and the maximum amplitude of the piston velocity which is calculated by the piston velocity calculation means; and an arithmetic means for calculating top dead point position information indicating a piston top dead point position in the piston reciprocating motion by performing the four fundamental rules of arithmetic on the basis of the bottom dead point position information and the piston stroke information.

According to a thirteenth aspect of the present invention, the linear compressor driving apparatus of the ninth aspect further includes: a top dead point position information detection sensor for detecting a piston top dead point position in the piston reciprocating motion to output top dead point position information indicating the detected position; and an arithmetic means for calculating center position information indicating a piston center position in the piston reciprocating motion by performing the four fundamental rules of arithmetic on the basis of the top dead point position information and the piston stroke information.

According to a fourteenth aspect of the present invention, the linear compressor driving apparatus of the ninth aspect further includes: a top dead point position information detection sensor for detecting a piston top dead point position in the piston reciprocating motion to output top dead point position information indicating the detected position; and an arithmetic means for calculating bottom dead point position information indicating a piston bottom dead point position in the piston reciprocating motion by performing the four fundamental rules of arithmetic on the basis of the top dead point position information and the piston stroke information.

According to a fifteenth aspect of the present invention, the linear compressor driving apparatus of the ninth aspect further includes: a bottom dead point position information detection sensor for detecting a piston bottom dead point position in the piston reciprocating motion; and an arithmetic means for calculating center position information indicating a piston center position in the piston reciprocating motion by performing the four fundamental rules of arithmetic on the basis of the bottom dead point position information and the piston stroke information.

According to a sixteenth aspect of the present invention, the linear compressor driving apparatus of the ninth aspect further includes: a bottom dead point position information detection sensor for detecting a piston bottom dead point position in the piston reciprocating motion to output bottom dead point position information indicating the detected position; and an arithmetic means for calculating top dead point position information indicating a piston top dead point position in the piston reciprocating motion by performing the four fundamental rules of arithmetic on the basis of the bottom dead point position information and the piston stroke information.

According to a seventeenth aspect of the present invention, the linear compressor driving apparatus of the ninth aspect further includes: a center position information calculation means for calculating center position information indicating a piston center position in the piston reciprocating motion on the basis of the output current from the inverter; and an arithmetic means for calculating top dead point position information indicating a piston top dead point position in the piston reciprocating motion by performing the four fundamental rules of arithmetic on the basis of the center position information and the piston stroke information.

According to an eighteenth aspect of the present invention, the linear compressor driving apparatus of the ninth aspect further includes: a center position information calculation means for calculating center position information indicating a piston center position in the piston reciprocating motion on the basis of the output current from the inverter; and an arithmetic means for calculating bottom deal point position information indicating a piston bottom dead point position in the piston reciprocating motion by performing the four fundamental rules of arithmetic on the basis of the center position information and the piston stroke information.

According to a nineteenth aspect of the present invention, in accordance with the linear compressor driving apparatus of either the tenth through twelfth aspects, the linear compressor has an elastic member which applies a force to the piston so as to bring the piston back to its neutral position when the piston is displaced from the neutral position; and the bottom dead point position information calculation means calculates, as the bottom dead point position information, position information indicating the piston bottom dead point position relative to the piston neutral position on the basis of the output voltage of the inverter and the frequency of the output current of the inverter, which are determined by the inverter controller, the maximum amplitude of the piston velocity which is calculated by the piston velocity calculation means, the weight of the movable member which performs the piston reciprocating motion in the linear compressor, and the spring constant of the elastic member.

According to a twentieth aspect of the present invention, in the linear compressor driving apparatus of the ninth aspect, the piston stroke calculation means repeats a calculation process for calculating the piston stroke information on the basis of the maximum amplitude of the piston velocity, where in each of the repeated calculation processes, the piston stroke calculation means corrects a thrust constant of the linear motor, whose value varies with variations in the piston position, on the basis of the piston stroke information calculated in a previous calculation process, and calculates the piston stroke information on the basis of the corrected thrust constant.

A linear compressor driving apparatus according to a twenty-first aspect of the present invention is a linear compressor driving apparatus for driving a linear compressor which has a piston and a linear motor for reciprocating the piston and which generates a compressed gas by the reciprocating motion of the piston with an AC voltage being applied to the linear motor. The linear compressor driving apparatus according to the twenty-first aspect comprises: an inverter for outputting an AC voltage and an AC current to the linear motor; a resonance frequency information output means for outputting resonance frequency information that indicates a resonance frequency of the piston reciprocating motion; a current detection means for detecting an output current of the inverter to output a current detection signal; an inverter controller for controller the inverter on the basis of the resonance frequency information so that the inverter outputs, as an output voltage and output current, a sinusoidal-wave-shaped voltage and a sinusoidal-wave-shaped current whose frequencies match the resonance frequency of the piston reciprocating motion, respectively; a timing detection means for detecting, as a specific phase timing, a phase timing at which a differentiated value of the output current of the inverter becomes zero; and a piston center position calculation means for calculating position information indicating a piston center position in the piston reciprocating motion on the basis of an instantaneous value of the output current of the inverter at the specific phase timing, with reference to a piston position where a pressure difference between the pressure of a cooling medium gas that is discharged from the linear compressor and the pressure of the cooling medium gas that is drawn into the linear compressor becomes zero.

According to a twenty-second aspect of the present invention, in the linear compressor driving apparatus of the twenty-first aspect, the linear compressor has an elastic member which applies a force to the piston so as to bring the piston back to its neutral position when the piston is displaced from the neutral position; and the center position information calculation means calculates, as the center position information, position information indicating the piston center position relative to the piston neutral position on the basis of the maximum amplitude of the output current from the inverter, the thrust constant of the linear motor, and the spring constant of the elastic member.

According to a twenty-third aspect of the present invention, the linear compressor driving apparatus of the twenty-first aspect further includes: a discharge pressure detection means for detecting the pressure of the cooling medium gas that is discharged from the linear compressor; and an inlet pressure detection means for detecting the pressure of the cooling medium gas that is drawn into the linear compressor; wherein the center position information calculation means calculates an action force in the direction of the piston reciprocating motion, which force acts on the piston from the cooling medium gas, on the basis of the pressure difference between the discharge pressure and the inlet pressure, and then calculates, as the center position information, position information indicating the piston center position relative to the piston position where the pressure difference becomes zero, on the basis of the calculated action force.

According to a twenty-fourth aspect of the present invention, in accordance with the linear compressor driving apparatus of the twenty-third aspect, the center position information calculation means calculates an action force in the direction of the piston reciprocating motion, which force acts on the piston from the cooling medium gas, on the basis of the pressure difference between the discharge pressure and the inlet pressure and the resonance frequency indicated by the resonance frequency information, and then calculates, as the center position information, position information indicating the piston center position relative to the piston position where the pressure difference becomes zero on the basis of the calculated action force.

As described above, according to the first aspect of the present invention, there is provided a linear compressor driving apparatus for driving a linear compressor which has a piston and a linear motor for making the piston reciprocate, and generates a compressed gas by the reciprocating motion of the piston, with an AC voltage being applied to the linear motor, and this apparatus comprises: an inverter for outputting an AC voltage and an AC current to the linear motor; a resonance frequency information output means for outputting resonance frequency information which indicates a resonance frequency of the reciprocating motion of the piston; a voltage detection means for detecting an output voltage of the inverter to output a voltage detection signal; a current detection means for detecting an output current of the inverter to output a current detection signal; an inverter controller for controlling the inverter on the basis of the resonance frequency information so that the inverter outputs, as the output voltage and output current of the inverter, a sinusoidal-wave-shaped voltage and a sinusoidal-wave-shaped current whose frequencies match the resonance frequency of the piston reciprocating motion, respectively; a timing detection means for detecting, as a specific phase timing, a phase timing at which a differentiated value of the output current of the inverter becomes zero; and a piston velocity calculation means for receiving the voltage detection signal and the current detection signal, and calculating a maximum amplitude of a piston velocity in the piston reciprocating motion on the basis of instantaneous values of the output voltage and the output current from the inverter at the specific phase timing. Therefore, a displacement of the piston can be easily and accurately obtained on the basis of the driving current and driving voltage of the linear compressor without having to use complicated calculations such as integration and differentiation.

According to the second aspect of the present invention, in accordance with the linear compressor driving apparatus of the first aspect, the timing detection means detects, as the specific phase timing, a phase timing at which the amplitude of the output current from the inverter becomes maximum. Therefore, in an arithmetic formula for calculating the piston velocity from the driving current and driving voltage of the linear compressor, a term including the differentiated value of the driving-current can be deleted as being zero.

According to the third aspect of present invention, in accordance with the linear compressor driving apparatus of the first aspect, the timing detection means detects a phase timing at which the phase of the output AC current from the inverter becomes at least one of 90° and 270°, as the specific phase timing, on the basis of the current detection signal. Therefore, in an arithmetic formula for calculating the piston velocity from the driving current and the driving voltage of the linear compressor, a term including the differentiated value of the driving current can be deleted as being zero.

According to the fourth aspect of the present invention, in accordance with the linear compressor driving apparatus of the third aspect, the inverter is provided with an inverter controller for outputting an inverter driving control signal which drives and controls the inverter; and the timing detection means detects a phase timing at which a differentiated value of the output current from the inverter becomes zero on the basis of the phase of the inverter driving control signal. Therefore, in an arithmetic formula for calculating the piston velocity from the driving current and driving voltage of the linear compressor, a term including the differentiated value of the driving current can be deleted.

According to the fifth aspect of the present invention, in accordance with the linear compressor driving apparatus of the fourth aspect, the timing detection means has a phase shift amount detector for detecting the amount of phase shift of the phase of the inverter driving control signal from the phase of the output current of the inverter, and detects a phase timing at which a differentiated value of the output current of the inverter becomes zero, on the basis of the inverter driving control signal whose phase is corrected so that the amount of phase shift becomes zero. Therefore, a phase timing at which the differentiated value of the output current of the inverter becomes zero can be correctly detected on the basis of the inverter driving control signal.

According to the sixth aspect of the present invention, in accordance with the linear compressor driving apparatus of the first aspect, the piston velocity calculation means performs a temperature correction process on a thrust constant of the linear motor, whose value varies with variations in temperature, and calculates a maximum amplitude of the piston velocity on the basis of the temperature-corrected thrust constant, the instantaneous current value, the instantaneous voltage value, and an internal resistance value of the linear motor. Therefore, the maximum amplitude of the piston velocity can always be detected with accuracy, irregardless of variations in the thrust constant of the linear motor due to variations in the temperature of the linear compressor.

According to the seventh aspect of the present invention, in accordance with the linear compressor driving apparatus of the first aspect, the piston velocity calculation means performs a temperature correction process on an internal resistance value of the linear motor, whose value varies with variations in temperature, and calculates a maximum amplitude of the piston velocity on the basis of the temperature-corrected internal resistance value, the instantaneous values of the output voltage and output current of the inverter, and a thrust constant of the linear motor. Therefore, the maximum amplitude of the piston velocity can always be detected with accuracy, irregardless of variations in the internal resistance value of the linear motor due to variations in the temperature of the linear compressor.

According to the eighth aspect of the present invention, in accordance with the linear compressor driving apparatus of the first aspect, the piston velocity calculation means repeats a velocity calculation process for calculating a maximum amplitude of the piston velocity, and in each of the repeated velocity calculation processes, the piston velocity calculation means corrects a thrust constant of the linear motor, whose value varies with variations in the piston velocity, on the basis of a maximum amplitude of the piston velocity which is calculated in the previous velocity calculation process, and calculates a maximum amplitude of the piston velocity on the basis of the corrected thrust constant. Therefore, the maximum amplitude of the piston velocity can always be detected with accuracy, irregardless of variations in the thrust constant of the linear motor due to variations in the piston velocity.

According to the ninth aspect of the present invention, the linear compressor driving apparatus of the first aspect further includes a stroke information calculation means for calculating piston stroke information which indicates a maximum amplitude of a piston displacement in the piston reciprocating motion on the basis of the output voltage of the inverter and the frequency of the output current of the inverter, which are determined by the inverter controller, and the maximum amplitude of the piston velocity that is calculated by the piston velocity calculation means. Therefore, the driving ability of the linear compressor can be controlled on the basis of the piston stroke information.

According to the tenth aspect of the present invention, the linear compressor driving apparatus of the first aspect further includes a bottom dead point position information calculation means for calculating bottom dead point position information which indicates a piston bottom dead point position in the piston reciprocating motion on the basis of the output voltage of the inverter and the frequency of the output current of the inverter, which are determined by the inverter controller, and the maximum amplitude of the piston velocity that is calculated by the piston velocity calculation means. Therefore, the amount of flexure of the resonance spring can be grasped according to the piston bottom dead point position information. Thereby, driving control of the linear compressor can also be carried out on the basis of the amount of flexure of the resonance spring so that the resonance spring is not deformed beyond its destruction limits.

According to the eleventh aspect of the present invention, the linear compressor driving apparatus in the ninth aspect further includes: a bottom dead point position information calculation means for calculating bottom dead point position information which indicates a piston bottom dead point position in the piston reciprocating motion on the basis of the output voltage of the inverter and the frequency of the output current of the inverter, which are determined by the inverter controller, and the maximum amplitude of the piston velocity that is calculated by the piston velocity calculation means; and an arithmetic means for calculating center position information which indicates a piston center position in the piston reciprocating motion by performing the four fundamental rules of arithmetic on the basis of the bottom dead point position information and the piston stroke information. Therefore, the linear compressor can be controlled on the basis of the piston center position information so that the piston vibration center position matches the position where the maximum efficiency of the linear motor can be achieved, whereby the linear compressor driving efficiency can be further enhanced.

According to the twelfth aspect of the present invention, the linear compressor driving apparatus of the ninth aspect further includes: a bottom dead point position information calculation means for calculating bottom dead point position information which indicates a piston bottom dead point position in the piston reciprocating motion on the basis of the output voltage of the inverter and the frequency of the output current of the inverter, which are determined by the inverter controller, and the maximum amplitude of the piston velocity which is calculated by the piston velocity calculation means; and an arithmetic means for calculating top dead point position information indicating a piston top dead point position in the piston reciprocating motion by performing the four fundamental rules of arithmetic on the basis of the bottom dead point position information and the piston stroke information. Therefore, the possibility of collision between the piston and the cylinder head can be judged with high accuracy on the basis of the top dead point position information.

According to the thirteenth aspect of the present invention, the linear compressor driving apparatus of the ninth aspect further includes: a top dead point position information detection sensor for detecting a piston top dead point position in the piston reciprocating motion to output top dead point position information indicating the detected position; and an arithmetic means for calculating center position information indicating a piston center position in the piston reciprocating motion by performing the four fundamental rules of arithmetic on the basis of the top dead point position information and the piston stroke information. Therefore, the linear compressor can be controlled by using a simple sensor so that the piston vibration center position matches the position where the maximum efficiency of the linear motor can be achieved, whereby the linear compressor driving efficiency can be further enhanced.

According to the fourteenth aspect of the present invention, the linear compressor driving apparatus of the ninth aspect further includes: a top dead point position information detection sensor for detecting a piston top dead point position in the piston reciprocating motion to output top dead point position information indicating the detected position; and an arithmetic means for calculating bottom dead point position information indicating a piston bottom dead point position in the piston reciprocating motion by performing the four fundamental rules of arithmetic on the basis of the top dead point position information and the piston stroke information. Therefore, the linear compressor can be controlled by using a simple sensor so that the resonance spring is not deformed beyond the destruction limits on the basis of the piston bottom dead point position information.

According to the fifteenth aspect of the present invention, the linear compressor driving apparatus of the ninth aspect further includes: a bottom dead point position information detection sensor for detecting a piston bottom dead point position in the piston reciprocating motion; and an arithmetic means for calculating center position information indicating a piston center position in the piston reciprocating motion by performing the four fundamental rules of arithmetic on the basis of the bottom dead point position information and the piston stroke information. Therefore, the linear compressor can be controlled by using a simple sensor so that the piston vibration center position matches the position where the maximum efficiency of the linear motor can be achieved, whereby the linear compressor driving efficiency can be further enhanced.

According to the sixteenth aspect of the present invention, the linear compressor driving apparatus of the ninth aspect further includes: a bottom dead point position information detection sensor for detecting a piston bottom dead point position in the piston reciprocating motion to output bottom dead point position information indicating the detected position; and an arithmetic means for calculating top dead point position information indicating a piston top dead point position in the piston reciprocating motion by performing the four fundamental rules of arithmetic on the basis of the bottom dead point position information and the piston stroke information. Therefore, by using a simple sensor the risk of collision between the piston and the cylinder head can be judged on the basis of the top dead point position information.

According to the seventeenth aspect of the present invention, the linear compressor driving apparatus of the ninth aspect further includes: a center position information calculation means for calculating center position information indicating a piston center position in the piston reciprocating motion on the basis of the output current from the inverter; and an arithmetic means for calculating top dead point position information indicating a piston top dead point position in the piston reciprocating motion, by performing the four fundamental rules of arithmetic on the basis of the center position information and the piston stroke information. Therefore, the possibility of collision between the piston and the cylinder head can be judged with high accuracy on the basis of the top dead point position information.

According to the eighteenth aspect of the present invention, the linear compressor driving apparatus of the ninth aspect further includes: a center position information calculation means for calculating center position information indicating a piston center position in the piston reciprocating motion on the basis of the output current from the inverter; and an arithmetic means for calculating bottom deal point position information indicating a piston bottom dead point position in the piston reciprocating motion by performing the four fundamental rules of arithmetic on the basis of the center position information and the piston stroke information. Therefore, driving control of the linear compressor can also be carried out so that the resonance spring is not compressed beyond the destruction limits, on the basis of the piston bottom dead point position information.

According to the nineteenth aspect of the present invention, in accordance with the linear compressor driving apparatus of any of the tenth through twelfth aspects, the linear compressor has an elastic member which applies a force to the piston so as to bring the piston back to its neutral position when the piston is displaced from the neutral position; and the bottom dead point position information calculation means calculates, as the bottom dead point position information, position information indicating the piston bottom dead point position relative to the piston neutral position on the basis of the output voltage of the inverter and the frequency of the output current of the inverter, which are determined by the inverter controller, the maximum amplitude of the piston velocity which is calculated by the piston velocity calculation means, the weight of the movable member which performs the piston reciprocating motion in the linear compressor, and the spring constant of the elastic member. Therefore, the amount of flexure of the resonance spring can be determined according to the piston bottom dead point position information. Thereby, driving control of the linear compressor so as to prevent the resonance spring from being deformed beyond the destruction limits can be easily carried out on the basis of the amount of flexure of the resonance spring.

According to the twentieth aspect of the present invention, in accordance with the linear compressor driving apparatus of the ninth aspect, the piston stroke calculation means repeats a calculation process for calculating the piston stroke information on the basis of the maximum amplitude of the piston velocity, where in each of the repeated calculation processes, the piston stroke calculation means corrects a thrust constant of the linear motor, whose value varies with variations in the piston position, on the basis of the piston stroke information calculated in the previous calculation process, and calculates the piston stroke information on the basis of the corrected thrust constant. Therefore, the maximum amplitude of the piston velocity can always be detected with accuracy, irregardless of variations in the thrust constant of the linear motor due to variations in the piston position.

According to the twenty-first aspect of the present invention, there is provided a linear compressor driving apparatus for driving a linear compressor which has a piston and a linear motor for reciprocating the piston, and generates a compressed gas by the reciprocating motion of the piston, with an AC voltage being applied to the linear motor, and this apparatus comprises: an inverter for outputting an AC voltage and an AC current to the linear motor; a resonance frequency information output means for outputting resonance frequency information that indicates a resonance frequency of the piston reciprocating motion; a current detection means for detecting an output current of the inverter to output a current detection signal; an inverter controller for controller the inverter on the basis of the resonance frequency information so that the inverter outputs, as its output voltage and output current, a sinusoidal-wave-shaped voltage and a sinusoidal-wave-shaped current whose frequencies match the resonance frequency of the piston reciprocating motion, respectively; a timing detection means for detecting, as a specific phase timing, a phase timing at which a differentiated value of the output current of the inverter becomes zero; and a piston center position calculation means for calculating position information indicating a piston center position in the piston reciprocating motion on the basis of an instantaneous value of the output current of the inverter at the specific phase timing, with reference to a piston position where a pressure difference between the pressure of a cooling medium gas that is discharged from the linear compressor and the pressure of the cooling medium gas that is drawn into the linear compressor becomes zero. Therefore, the linear compressor can be controlled on the basis of the piston center position information so that the piston vibration center position matches the position where the maximum efficiency of the linear motor can be achieved, whereby the linear compressor driving efficiency can be further enhanced.

According to the twenty-second aspect of the present invention, in accordance with the linear compressor driving apparatus of the twenty-first aspect, the linear compressor has an elastic member which applies a force to the piston so as to bring the piston back to its neutral position, when the piston is displaced from the neutral position; and the center position information calculation means calculates, as the center position information, position information indicating the piston center position relative to the piston neutral position, on the basis of the maximum amplitude of the output current from the inverter, the thrust constant of the linear motor, and the spring constant of the elastic member. Therefore, the linear compressor can be controlled on the basis of the piston center position information so that the piston vibration center position matches the position where the maximum efficiency of the linear motor can be achieved, whereby the linear compressor driving efficiency can be further enhanced.

According to the twenty-third aspect of the present invention, the linear compressor driving apparatus of the twenty-first aspect further includes: a discharge pressure detection means for detecting the pressure of the cooling medium gas that is discharged from the linear compressor; and an inlet pressure detection means for detecting the pressure of the cooling medium gas that is drawn into the linear compressor; wherein the center position information calculation means calculates an action force in the direction of the piston reciprocating motion, which force acts on the piston from the cooling medium gas, on the basis of the pressure difference between the discharge pressure and the inlet pressure, and then calculates, as the center position information, position information indicating the piston center position relative to the piston position where the pressure difference becomes zero, on the basis of the calculated action force. Therefore, the linear compressor can be controlled on the basis of the piston center position information so that the piston vibration center position matches the position where the maximum efficiency of the linear motor can be achieved, whereby the linear compressor driving efficiency can be further enhanced.

According to the twenty-fourth aspect of the present invention, in accordance with the linear compressor driving apparatus of the twenty-third aspect, the center position information calculation means calculates an action force in the direction of the piston reciprocating motion, which force acts on the piston from the cooling medium gas, on the basis of the pressure difference between the discharge pressure and the inlet pressure, and the resonance frequency indicated by the resonance frequency information, and then calculates, as the center position information, position information indicating the piston center position relative to the piston position where the pressure difference becomes zero on the basis of the calculated action force. Therefore, the linear compressor can be controlled on the basis of the piston center position information so that the piston vibration center position matches the position where the maximum efficiency of the linear motor can be achieved, whereby the linear compressor driving efficiency can be further enhanced.

BRIEF DESCRIPTION OF THE DRAWINGS

FIGS. 2(a)–2(d) are diagrams illustrating concrete circuit constructions of inverters to be employed in the linear compressor driving apparatus according to the first embodiment, where FIG. 2(a) illustrates a voltage type full bridge inverter, FIG. 2(b) illustrates a current type full bridge inverter, and FIG. 2(c) and 2(d) illustrate voltage type half bridge inverters.

DETAILED DESCRIPTION OF THE INVENTION

Initially, the fundamental principles of the present invention will be briefly described.

Under a resonance driving state of a linear compressor wherein a linear compressor is driven in a resonance state of a piston reciprocating motion, a state where the phase of an AC current (driving current) applied to the linear compressor matches a phase corresponding to the velocity of the reciprocating piston is maintained. That is, in the resonance driving state, the amplitude of the piston velocity of the linear compressor becomes its maximum at a time when the differentiated value of the linear compressor driving current becomes zero.

The inventors of the present invention have noticed the relationship between the phase of the linear motor driving current and the phase of the piston velocity in the resonance driving state of the liner compressor and have found that the maximum amplitude of the piston velocity can be detected with high accuracy by detecting a phase timing at which the differentiated value of the linear compressor driving current becomes zero, and that the piston top dead point position can be calculated from the maximum amplitude of the piston velocity.

Hereinafter, embodiments of the present invention will be described.

First Embodiment

Figure 1:
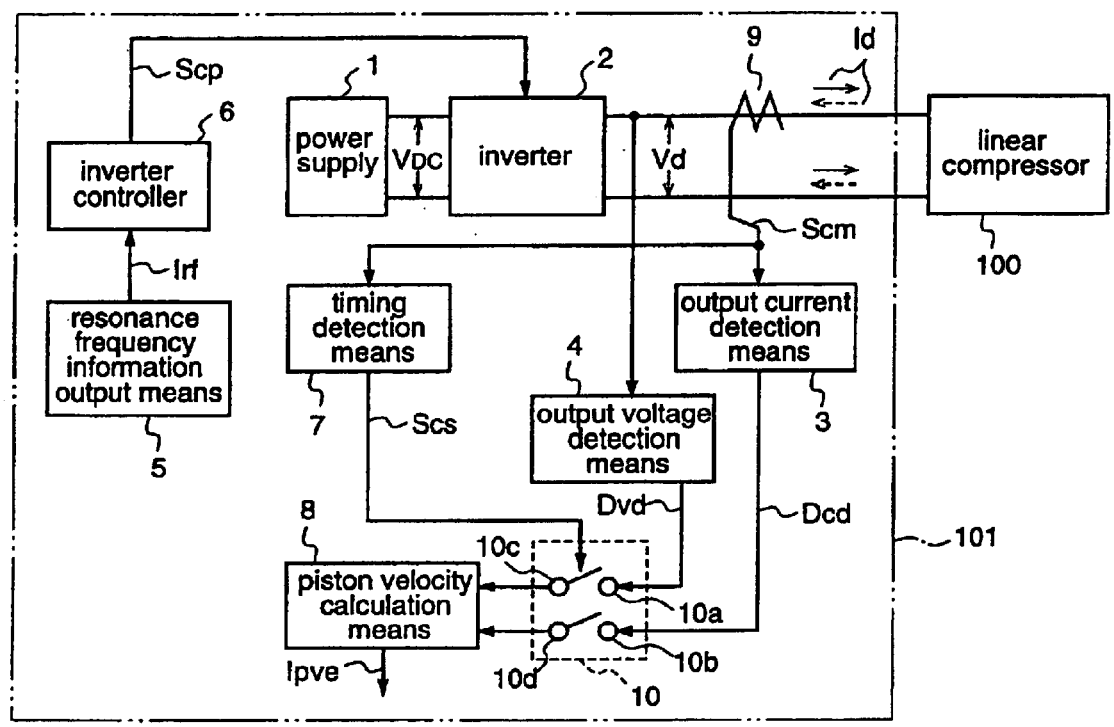
FIG. 1 is a block diagram for explaining a linear compressor driving apparatus according to a first embodiment of the present invention.

FIG. 1 is a block diagram for explaining a linear compressor driving apparatus according to a first embodiment of the present invention.

The linear compressor driving apparatus 101 according to the first embodiment is an apparatus for driving a linear compressor 100 which is constituted such that the piston reciprocating motion is in the resonance state when the frequency of the piston reciprocating motion is a frequency (resonance frequency) Fr.

To be specific, the linear compressor driving apparatus 101 includes a power supply 1 which generates a DC voltage $V_{DC}$ as a power supply voltage, an inverter 2 which converts the power supply voltage $V_{DC}$ into an AC voltage Vd of a predetermined frequency and outputs it to the linear compressor 100, a current sensor 9 which monitors an inverter output current Id that is output from the inverter 2 to the linear compressor 100, an output current detection means 3 which detects the inverter output current Id from the inverter 2 on the basis of the monitored output current ID of the current sensor (monitor output) Scm, and an output voltage detection means 4 which detects an inverter output voltage Vd that is output from the inverter to the linear compressor 100.

The linear compressor driving apparatus 101 further includes a resonance frequency information output means 5 which outputs resonance frequency information Irf indicating the resonance frequency Fr of the piston reciprocating motion, an inverter controller 6 which controls the inverter 2 according to an inverter control signal Scp so that the frequency Fid of the output current Id matches the resonance frequency Fr on the basis of the resonance frequency information Irf, and a timing detection means 7 which detects a phase timing when the differentiated value of the output current Id from the inverter 2 (the driving current of the linear compressor 100) becomes zero, on the basis of the monitor output Scm output from the current sensor 9.

The linear compressor driving apparatus 101 further includes a piston velocity calculation means 8 which calculates the maximum amplitude (maximum velocity) of the piston velocity on the basis of a voltage detection result (driving voltage detection signal) Dvd output from the output voltage detection means 4 and a current detection result (driving current detection signal) Dcd output from the output current detection means 3, and an open/close switch 10 which controls the supply and stop of supply of the driving voltage detection signal Dvd and the driving current detection signal Dcd to the piston velocity calculation means 8 on the basis of a detection result Scs output from the timing detection means 7.

Next, the respective components of the linear compressor driving apparatus will be described in detail.

Initially, the resonance frequency information output means 5 will be described.

In this first embodiment, as described above, the linear compressor 100 is designed so as to have a constant resonance frequency Fr as the resonance frequency of the piston reciprocating motion under the load conditions with which the compressor 100 operates, and so that the resonance frequency information output means 5 outputs the resonance frequency information Irf indicating this specific resonance frequency.

However, the resonance frequency information output means 5 is not restricted to the above-mentioned one which outputs information indicating the specific resonance frequency Fr that is previously set for the linear compressor 100.

Figure 7:
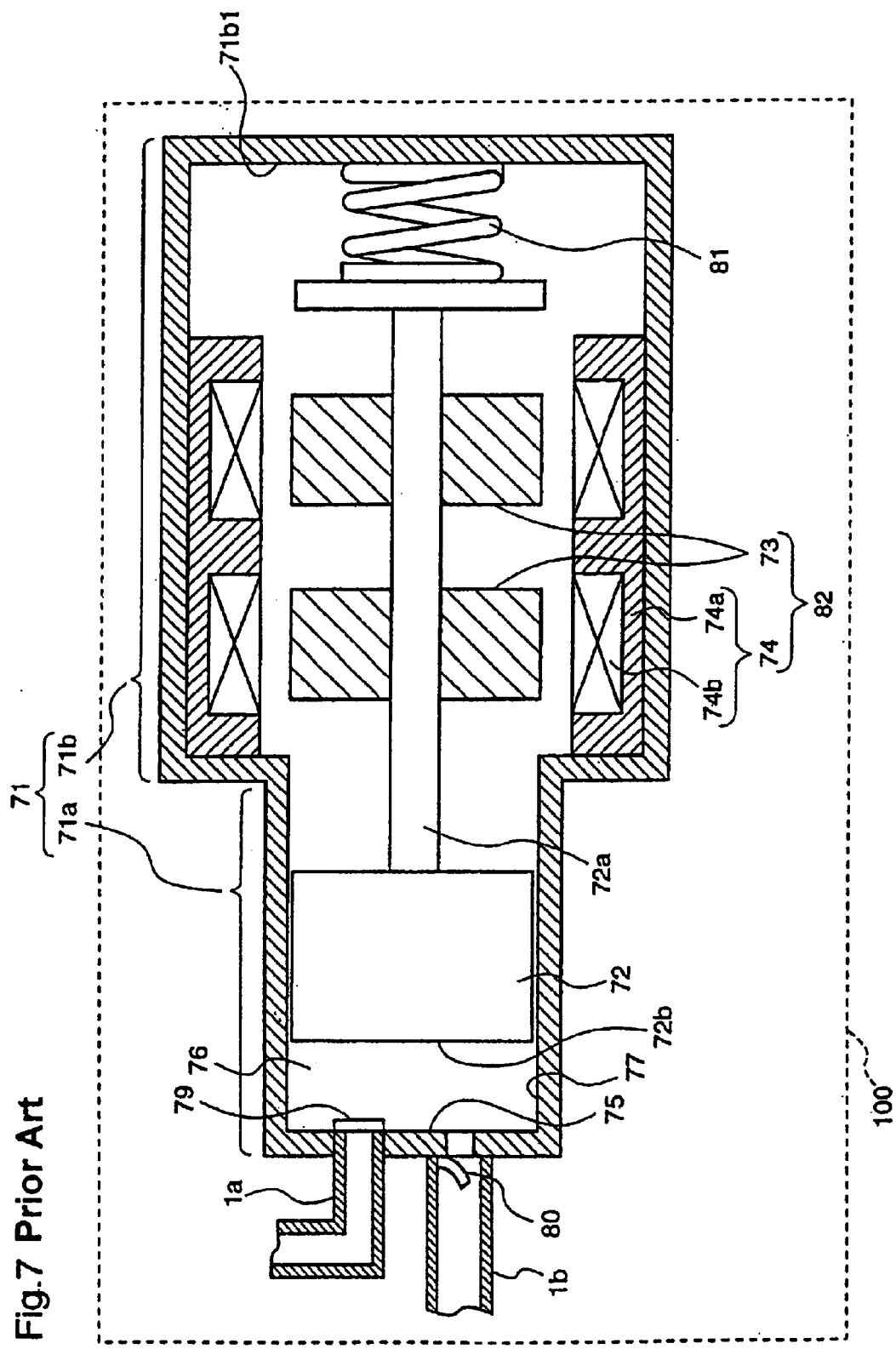
FIG. 7 is a cross-sectional view for explaining a conventional linear compressor.

For example, in the linear compressor 100 shown in FIG. 7, the spring force which is generated by the compressed cooling medium gas and which acts on the piston is large, and the spring force significantly varies depending on the operating state of the linear compressor 100, e.g., the pressure of the compressed cooling medium gas or the displacement of the piston 72. Therefore, actually, the resonance frequency of the linear compressor 100 cannot be uniquely determined.

So, the resonance frequency information output means 5 may monitor the state of the compressed cooling medium gas, estimate a resonance frequency appropriate to the state of the compressed cooling medium gas, and output information indicating the estimated resonance frequency. As a method for estimating a resonance frequency appropriate to the state of the cooling medium gas, a resonance frequency may be calculated from variables indicating the state of the cooling medium gas (e.g., the pressure and temperature of the cooling medium) on the basis of a predetermined functional equation, or a resonance frequency may be estimated from variables with reference to a table indicating correspondences between the variables and resonance frequencies.

Furthermore, as described in a specification of Japanese Patent Application No. 2000-361301, under a condition that the amplitude of an AC current to be inputted to the linear compressor 100 as its driving current is constant, a frequency at which power consumption by the linear compressor becomes maximum when the frequency of the AC current is varied may be estimated as a reference frequency.

Next, the inverter controller 6, the inverter 2, and the input power supply 1 of the inverter 2 will be described in detail.

The inverter controller 6 outputs, to the inverter 2, a PWM (Pulse Width Modulation) signal for switching the inverter 2 as a control signal Scp for the inverter 2, and controls the pulse width of the PWM signal Scp on the basis of the resonance frequency information Irf output from the resonance frequency information output means 5. The PWM signal Scp drives the inverter 2 for a period corresponding to the pulse width.

The inverter 2 receives a voltage $V_{DC}$ from the power supply 1, and supplies an AC voltage Vd and an AC current Id whose frequencies are equal to the resonance frequency Fr, to the linear compressor 100, on the basis of the inverter control signal Scp supplied from the inverter controller 6. Although a DC power supply for supplying a DC voltage to the inverter 2 is necessary as the input power supply 1 for the inverter 2, the input power supply for the inverter 2 may be a commercial AC power supply. Such input power supply is composed of a rectifier circuit for rectifying a commercial AC voltage (current), such as a diode bridge circuit or a high strength converter, and a smoothing condenser for smoothing the output of the rectifier circuit.

There are various kinds of concrete circuit structures of the inverter 2 as shown in FIGS. 2(a)–2(d).

The inverters shown in FIG. 2(a) and 2(b) are a voltage type full bridge inverter 21 and a current type full bridge inverter 22, respectively, and each of these full bridge inverters has four switching elements and diodes corresponding to the respective switching elements. Each of these full bridge inverters outputs a voltage in a range from $+V_{DC}$ to $-V_{DC}$ to a load L when the voltage of its input power supply is a DC voltage $V_{DC}$.

To be specific, the voltage type full bridge inverter 21 is composed of a first series connection circuit C1a in which first and second switching circuits 21a and 21b are connected in series, and a second series connection circuit C1b in which third and fourth switching circuits 21c and 21d are connected in series. The second series connection circuit C1b is connected in parallel with the first series connection circuit C1a in the voltage type full bridge inverter 21. Each of the respective switching circuits 21a–21d of the voltage type full bridge inverter 21 is composed of a switching element S1 comprising an NPN transistor, and a diode D1 which is connected in reverse-parallel with the switching element S1. In the voltage type full bridge inverter 21, the DC voltage $V_{DC}$ from the power supply 1 is applied to an end of both the first and second series connected circuits C1a and C1b, and the AC voltage Vd to be applied to the load L is generated between a node N1a of the first and second switching circuits 21a and 21b in the first series connection circuit C1a and a node N1b of the third and fourth switching elements 21c and 21d in the second series connection circuit C1b.

Further, the current type full bridge inverter 22 is composed of: a first series connection circuit C2a in which first and second switching circuits 22a and 22b are connected in series; a second series connection circuit C2b in which third and fourth switching circuits 22c and 22d are connected in series, which circuit C2b is connected in parallel with the first series connection circuit C2a; and an inductance element 22e, an end of which is connected to ends of the first and second series connection circuits C2a and C2b, respectively. Each of the respective switching circuits 22a–22d is composed of a switching element S2 comprising an NPN transistor, and a diode D2 whose anode is connected to an emitter of the NPN transistor. In this current type full bridge inverter 22, when the DC voltage $V_{DC}$ from the power supply 1 is applied between the other end of the inductance element 22e and the other ends of the first and second series connection circuits C2a and C2b, the AC voltage Vd to be applied to the load L is generated between a node N2a of the first and second switching circuits 22a and 22b in the first series connection circuit C2a and a node N2b of the third and fourth switching circuits 22c and 22d in the second series connection circuit C2b.

Further, the inverters shown in FIGS. 2(c) and 2(d) are voltage type half bridge inverters 23 and 24, respectively, each comprising two switching elements, and diodes corresponding to the respective switching elements.

The voltage type half bridge inverter 23 outputs a voltage in a range from $+V_{DC}/2$ to $-V_{DC}/2$, to the load L, when the voltage at its input power supply is the DC voltage $V_{DC}$. Further, the voltage type half bridge inverter 24 outputs a voltage in a range from $+V_{DC}$ to 0 when the voltage at its input power supply is the DC voltage $V_{DC}$. In this way, the utilization factor of the power supply 1 by the half bridge inverter is half that of the full bridge inverter.

To be specific, the voltage type half bridge inverter 23 is composed of a first series connection circuit C3a in which first and second switching circuits 23a and 23b are connected in series, and a second series connection circuit C3b in which first and second capacitance circuits 23c and 23d are connected in series. The second series connection circuit C3b is connected in parallel with the first series connection circuit C3a in the voltage type half bridge inventor 23. Each of the respective switching circuits 23a–23d is composed of a switching element S3 comprising an NPN transistor, and a diode D3 which is connected in reverse-parallel with the switching element S3. The first and second capacitance circuits 23c and 23d comprise condensers 23c and 23d, respectively. In this voltage type half bridge inverter 23, when the DC voltage $V_{DC}$ from the power supply 1 is applied to an end of both the first and second series connected circuits C3a and C3b, the AC voltage Vd to be applied to the load L is generated between a node N3a of the first and second switching circuits 23a and 23b in the first series connection circuit C3a and a node N3b of the first and second capacitance circuits 23c and 24d in the second series connection circuit C3b.

Further, the voltage type half bridge inverter 24 is composed of a series connection circuit C4a in which first and second switching circuits 24a and 24b are connected in series. Each of the switching circuits 24a and 24b is composed of a switching element S4 comprising an NPN transistor, and a diode D4 which is connected in inverse-parallel with the switching element S4. In the voltage type half bridge inverter 24, when the output voltage from the DC power supply 1 is applied to both ends of the series connection circuit C4a (i.e., at an end of both the series connection circuits 24a and 24b ), the AC voltage Vd to be applied to the load L is generated between an anode and a cathode of the diode D4 which is a component of the second switching circuit 24a.

Next, the output current detection means 3, the current sensor 9, the output voltage detection means 4, the open/close switch 10, and the timing detection means 7 will be described in detail.

The output current detection means 3 detects the inverter output current (linear compressor driving current) Id applied to the linear motor 82 (refer to FIG. 7) of the linear compressor 100 on the basis of the driving current monitor signal Scm as a monitor output of the current sensor 9, and outputs the driving current detection signal Dcd to the open/close switch 10. As an example of the current sensor 9, there is a magnetic type current detection sensor using a magnetic substance and a Hall element, or a current transformer which generates a voltage according to the linear compressor driving current. Further, as a method for detecting the driving current of the linear compressor 100, there is a method of calculating a current from a voltage which is generated in a shunt resistor placed in the current supply path.

The output voltage detection means 4 detects the inverter output voltage (linear compressor driving voltage) Vd to be supplied from the inverter 2 to the linear motor 82 (refer to FIG. 7) of the linear compressor 100, and outputs a driving voltage detection signal Dvd to the open/close switch 10. When the inverter 2 is a voltage type inverter, since the waveform of the inverter output voltage Vd is a PWM waveform, it is difficult to directly measure the inverter output voltage Vd. So, as a method for measuring the output voltage from the voltage type inverter, there is a method of subjecting the output voltage to PWM waveform shaping by using a low-pass filter comprising a transformer or a condenser and a resistor, and measuring the waveform-shaped output voltage. Further, as a method for measuring the output voltage from the voltage type inverter, besides the above-mentioned method using a low-pass filter, there is a method of calculating the output voltage vd of the inverter 2, on the basis of the DC voltage $V_{DC}$ inputted to the inverter 2, and the pulse width of the PWM signal that is the inverter control signal Scp outputted from the inverter controller 6.

The open/close switch 10 has a first input side node 10a to which the driving voltage detection signal Dvd outputted from the output voltage detection means 4 is input. The open/close switch 10 also has a second input side node 10b to which the driving current detection signal Dcd outputted from the output current detection means 3 is input. The open/close switch further includes a first output side node 10c for outputting the driving voltage detection signal Dvd to the piston velocity detection means 8 and a second output side node 10d for outputting the driving current detection signal Dcd to the piston velocity detection means 8. The open/close switch 10 connects or isolates the first input side node 10b to/from the second output side node 10c, and connects or isolates the second input side node 10c to/from the first output side node 10d.

The timing detection means 7 detects a phase timing at which the phase of the linear compressor driving current Id matches at least one of 90° and 270° on the basis of the driving current monitor signal Scm outputted from the current sensor 9, and outputs a switch control signal Scs for connecting the first (second) input side node 10a (10b) to the first (second) output side node 10c (10d), at the detected phase timing, to the open/close switch 10. This timing detector 7 utilizes the fact that the inverter output current (linear compressor driving current) Id is a sinusoidal wave, and therefore, the inverter output current Id takes an extreme value when its phase is 90° or 270°. The timing detector 7 detects a phase timing at which the phase of the driving current matches at least one of 90° and 270° as a phase timing at which the driving current Id takes a peak value (maximum amplitude).

Finally, the piston velocity calculation means 8 will be described in detail.

The piston velocity calculation means 8 receives the driving current detection signal Dcd from the output current detection means 3 and the driving voltage detection signal Dvd from the output voltage detection means 4 at the phase timing detected by the timing detector 7, and calculates the maximum amplitude of the velocity of the piston that reciprocates at a constant angular velocity (the maximum value of the absolute value of the piston velocity) from the instantaneous values of the inverter output current Id, the inverter output voltage Vd at the phase timing and the thrust constant of the linear motor. The piston velocity calculation means 8 outputs piston velocity information Ipve indicating the maximum amplitude of the piston velocity.

Next, the arithmetic processing to be performed by the piston velocity calculation means 8 will be specifically described with reference to drawings and formulae.

Figure 3:
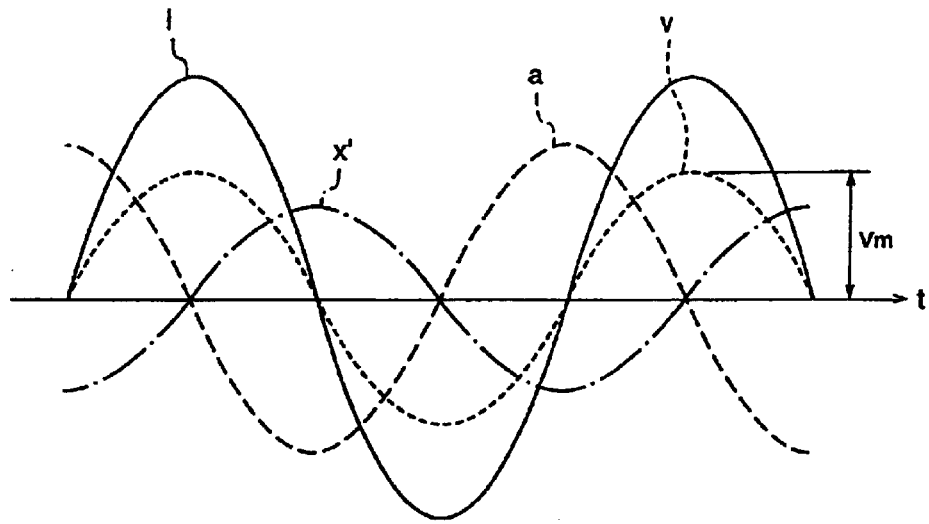
FIG. 3 is a diagram illustrating the phases of piston displacement, piston velocity, and piston acceleration with respect to the phase of driving current in the resonance driving state of a linear compressor that is driven by the linear compressor driving apparatus according to the first embodiment.

FIG. 3 is a diagram for explaining the resonance driving state of the linear compressor wherein the linear compressor is driven in the resonance state of piston reciprocating motion, and FIG. 3 illustrates how the driving current Id, piston velocity (reciprocation velocity) v, piston displacement x', and piston acceleration a change in the resonance driving state. The piston displacement x' is a displacement of the piston position with respect to the piston amplitude center position Pav shown in FIG. 9.

Since the inverter output current (linear motor driving current) Id supplied to the linear compressor 100 is proportional to the force applied to the piston, the phase of the linear motor driving current Id is equal to the phase of the piston velocity v in the resonance driving state of the linear compressor 100. Further, since the piston displacement x' and the piston acceleration a correspond to an integrated value and a differentiated value of the piston velocity v, respectively, the phase of the piston displacement x' is delayed by 90° with respect to the phase of the piston velocity v, and the phase of the piston acceleration a is advanced by 90° with respect to the phase of piston velocity v in the resonance driving state of the linear compressor.

Figure 8:
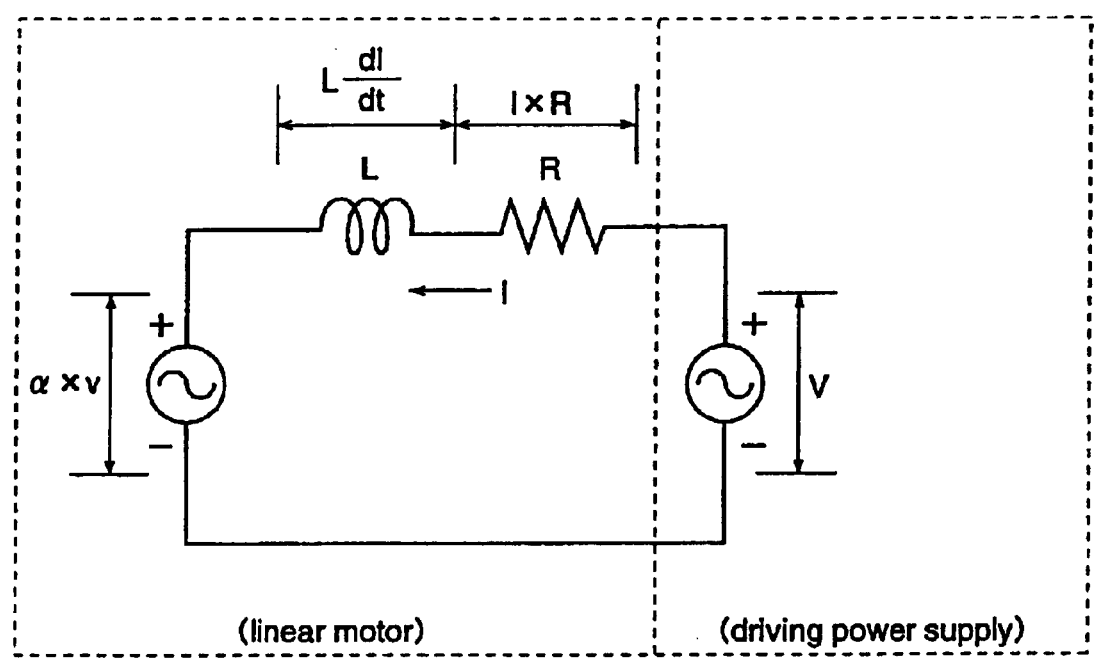
FIG. 8 is a diagram illustrating an equivalent circuit of a linear motor as one of components of the linear compressor.

Further, as for the equation of motion of the piston, formula (1) holds, which is derived from the equivalent circuit of the linear motor (refer to FIG. 8) according to the Kirchhoff's law, as already explained for the prior art. However, as the equation of motion of the piston in the resonance driving state of the linear compressor, the following formula (5) especially holds instead of formula (1).

$$Vm = \frac{1}{\alpha}(V_1 - R \times I_1) \qquad (5)$$

To be brief, as shown in FIG. 3, in the resonance driving state where the linear compressor 100 is driven in the resonance state of the piston reciprocating motion, the phase of the linear motor driving current Id is equal to the phase of the piston velocity v. For example, when the phase of the driving current Id is 90° or 270°, the phase of the piston velocity v is also 90° or 270°.

To be specific, in the resonance driving state of the linear compressor 100, the piston velocity v takes its maximum value or minimum value, i.e., the absolute value of the piston velocity becomes maximum, at the phase timing detected by the timing detection means 7 (the timing at which the phase of the driving current Id is 90° or 270°), and the driving current Id also takes its maximum value or minimum value. Therefore, the differentiated value of the driving current Id becomes zero, whereby the value of the third term in the right side of formula (1) becomes zero.

Accordingly, when the linear compressor is in the resonance driving state, formula (5), which is obtained by deleting the third term $$\left(\text{i.e., } L\frac{dI}{dt}\right)$$

in the right side of formula (1), holds. A variable V and a variable I in formula (5) are a measured value V of the inverter output voltage Vd and a measured value I of the inverter output current Id, respectively.

Based on formula (5), the maximum amplitude (the maximum value or minimum value) v0[m/s] of the piston velocity v is obtained from the instantaneous value V1[V] of the inverter output voltage Vd (measured value V) at the timing when the phase of the driving current of the linear compressor is 90° or 270° the instantaneous value I1[A] of the inverter output current Id (measured value I) at this timing, the equivalent resistance R [Ω] of the coil as a component of the linear motor, and the thrust constant α [N/A] of the motor.

In the linear compressor driving apparatus 101 according to the first embodiment, the respective means 3–5, 7, and 8 as components of the linear compressor driving apparatus 101, and the inverter controller 6 are constituted by software. However, these means 3–5, 7, and 8, and the inverter controller 6 may be constituted by hardware.

Further, in the description of the first embodiment, for simplification, the linear compressor driving apparatus 101 has the open/close switch 10 constituted by hardware.

However, when the respective means 3–8 are constituted by software, the linear compressor driving apparatus 101 can be constituted without using the open/close switch 10.

For example, instead of using the open/close switch 10, the output current detection means 3 and the output voltage detection means 4 may be operated only when the timing detection means 7 detects a phase timing at which the phase of the linear compressor driving current Id matches at least one of 90° and 270° to output the driving current detection signal Dcd and the driving voltage detection signal Dvd to the piston velocity detection means 8, respectively.

Next, the operation of the linear compressor driving apparatus 101 will be described.

The inverter controller 6 generates a pulse signal Scp whose pulse width is adjusted according to the resonance frequency information Irf outputted from the resonance frequency information output means 5, and the inverter controller 6 supplies the pulse signal Scp as an inverter control signal to the inverter 2. The pulse width of the pulse signal Scp is adjusted so that the linear compressor 100 is driven in the resonance state of the piston reciprocating motion.

When the pulse signal Scp is supplied to the inverter 2, the inverter 2 generates an AC voltage Vd whose frequency matches the resonance frequency Fr, from the DC voltage $V_{DC}$ supplied from the power supply 1, on the basis of the pulse signal Scp, and the inverter 2 outputs the AC voltage Vd to the linear motor 82 of the linear compressor 100 as its driving voltage.

For example, when the voltage type full bridge inverter 21 shown in FIG. 2($a$) is used as the inverter 2, the pulse signal Scp from the inverter controller 6 is applied to the bases of the NPN transistors (switching elements) S1 constituting the respective switching circuits 21$a$–21$d$ in the inverter 21. In the inverter 21, ON/OFF operations of the switching elements S1 of the first and fourth switching circuits 21$a$ and 21$d$, and ON/OFF operations of the switching elements S1 of the second and third switching circuits 21$b$ and 21$c$ are complementary carried out. Thereby, an AC voltage as the inverter output voltage Id is generated between the connection node N1$a$ of the first series connection circuit C1$a$ and the connection node N1$b$ of the second series connection circuit C1$b$, and this AC voltage Vd is applied as a driving voltage to the linear motor 82 of the linear compressor 100.

In the linear compressor 100, when the driving voltage Vd is applied to the linear motor, the piston starts a reciprocating motion. Thereafter, when the driving state of the linear compressor 100 is stabilized, the linear compressor 100 goes into the resonance driving state where the piston reciprocating motion is in the resonance state under a predetermined load condition.

At this time, the driving current Id supplied to the linear compressor is monitored by the current sensor 9, and the current sensor 9 outputs a current monitor output (driving current monitor signal) Scm to both the output current detection means 3 and the timing detection means 7.

In the output current detection means 3, the inverter output current, i.e., the driving current Id of the linear compressor 100, is detected on the basis of the current monitor output Scm from the current sensor 9, and a current detection result (driving current detection signal) Dcd is output to the first input side node 10$a$ of the open/close switch 10. Further, in the output voltage detection means 4, the inverter output voltage Vd is detected, and a voltage detection result (driving voltage detection signal) Dvd is output to the second input side node 10$b$ of the open/close switch 10.

In the timing detection means 7, the phase timing at which the phase of the driving current Id becomes 90° or 270° is detected on the basis of the current monitor output Scm output from the current sensor 9 and, at this phase timing, the switch control signal Scs for connecting the first and second input side nodes 10$a$ and 10$b$ of the open/close switch 10 with the corresponding first and second output side nodes 10$c$ and 10$d$ is output to the open/close switch 10.

In the open/close switch 10, the corresponding input side node and output side node are connected at the phase timing according to the switch control signal Scs, and the values (instantaneous values) I1 and V1 of the driving current Id and the driving voltage Vd at the phase timing are output to the piston velocity calculation means 8.

In the piston velocity calculation means 8, a crest value vm of the piston velocity is calculated from the instantaneous values I1 and V1 of the driving current and the driving voltage at the phase timing, on the basis of formula (5) described above, and piston velocity information Ipve indicating the crest value is output.

As described above, in the linear compressor driving apparatus 101 according to the first embodiment, the linear compressor 100 is driven under the resonance driving state where the piston reciprocating motion is in the resonance state, and the instantaneous value V1[V] of the driving voltage and the instantaneous value I1[A] of the driving current when the phase of the linear compressor driving current Id under this driving state becomes 90° or 270° are measured. Further, in the linear compressor driving apparatus 101 according to the first embodiment the maximum amplitude vm [m/s] of the piston velocity is obtained on the basis of a predetermined function expression by using the measured instantaneous value V1[V] of driving voltage and the measured instantaneous value I1[A] of driving current, the equivalent resistance [Ω] of the coil of the linear motor, and the thrust constant α [N/A] of the motor. Therefore, the number of times the driving current is measured is reduced as compared with the case where the piston velocity is obtained by performing differentiation based on the measured value of the linear compressor driving current, and the maximum amplitude vm [m/s] of the piston velocity can be obtained by measuring the driving current and the driving voltage once for every cycle of the driving current, at the minimum.

Furthermore, in this first embodiment, since the maximum amplitude vm of the piston velocity is calculated by the four fundamental rules of arithmetic using the driving current instantaneous value I1[A] and the driving voltage instantaneous value V1[V] at the timing when the phase of the driving current Id is 90° or 270°, it is not necessary to perform differentiation of the driving current to calculate the maximum amplitude of the piston velocity. Therefore, calculation errors caused by a differentiator are eliminated so as to enhance the piston velocity calculating accuracy.

While in this first embodiment the timing detection means 7 detects a phase timing at which the phase of the inverter output current (linear compressor driving current) Id becomes at least one of 90° and 270°, the timing detection means 7 may detect a phase timing at which the amount of change in the driving current Id of the linear compressor 100 becomes zero.

Also, in this case, the timing detector 7 outputs a phase timing at which the instantaneous value of the driving current (inverter output current) Id becomes the crest value (maximum amplitude). The reason is as follows. Since the driving current is a sinusoidal wave, the driving current takes its peak value when the phase of the driving current is 90° and 270°.

Furthermore, as a method of detecting a timing at which the driving current (inverter output current) Id takes its crest value, there is proposed a method of continuously monitoring the value of the inverter output current, and detecting a phase timing at which the direction of change of this value is switched, i.e., a phase timing at which the direction of change of the output current value is switched from increase to decrease or from decrease to increase.

Furthermore, while in this first embodiment the timing detection means 7 detects a phase timing at which the phase of the output current from the inverter 2 becomes 90° or 270° on the basis of the monitor output Scm of the current sensor 9, the timing detection means 7 may detect a phase timing at which the phase of the output current from the inverter 2 becomes 90° or 270° on the basis of the pulse signal Scp, which is a control signal for the inverter 2 outputted from the inverter controller 6.

In this case, however, there is a possibility that the phase of the inverter output current which is theoretically determined from the inverter control signal (pulse signal) Scp for the inverter 2 outputted from the inverter controller 6 might deviate from the phase of the output current Id which is actually output from the inverter 2 by an amount equivalent to a control error.

So, there is proposed a method of detecting a phase difference between the phase of the ideal inverter output current based on the inverter control signal Scp outputted from the inverter controller 6 and the phase of the output current Id actually outputted from the inverter 2, and correcting the phase of the inverter control signal Scp from the inverter controller 6 on the basis of the detected phase difference. As a concrete method of detecting such phase difference, there is proposed a method of measuring a phase timing at a zero cross point of the output current Id which is actually output from the inverter 2, and calculating a difference between this phase timing and a phase timing at which the phase of the inverter control signal Scp from the inverter controller 6 becomes 0° or 180°.

Further, while in this first embodiment the internal resistance value R of the linear motor to be used in the arithmetic processing by the piston velocity calculation means 8 is a specific value that is measured in advance, the internal resistance value R may be subjected to correction based on temperature.

To be brief, actually, the internal resistance value R of the linear motor increases as the temperature of the linear motor increases.

So, a more accurate value can be obtained as a crest value of the piston velocity by measuring the temperature of the linear motor, and using a value obtained by subjecting a previously measured internal resistance value to correction based on the temperature in the piston velocity calculation.

As a concrete method for temperature-correcting the internal resistance value, there is proposed a method using a table showing the relationships between the temperatures of conductors to be used as the coil of the linear motor and their resistance values, or a method using a calculation formula for temperature-correcting the internal resistance value.

For example, when the coil of the linear motor is a copper coil that is generally used, a resistance value Rt at t° C. in relation to a resistance value R20 measured at 20° C., can be obtained by the following formula (6).

$$Rt = R20\{1 + 0.00393 \times (t-20)\} \quad (6)$$

Further, while in this first embodiment the thrust constant of the linear motor to be used in the arithmetic processing by the piston velocity calculation means 8 is a specific value that is measured in advance, the thrust constant may be subjected to correction according to the driving state of the linear compressor.

For example, the thrust constant may be subjected to correction according to the temperature of the linear motor. That is, actually, the thrust constant decreases as the temperature of the linear motor increases. This is because the flux density of the magnetic substance used in the linear motor decreases as the temperature increases. So, a more accurate value can be obtained as the crest value of the piston velocity by measuring the temperature of the linear motor, and using a value obtained by subjecting a previously measured thrust constant to correction based on the temperature in the piston velocity calculation. As a concrete method for subjecting the thrust constant to temperature correction, there is proposed a method using a table showing the relationships between the temperatures of available magnetic substances and their flux densities.

Furthermore, the thrust constant may be subjected to correction according to the driving velocity (angular velocity) of the linear motor. That is, actually, the thrust constant of the linear motor decreases as the driving velocity (angular velocity) of the linear motor increases. So, the piston velocity calculation means 8, which repeatedly calculates the piston velocity, may correct the thrust constant of the linear motor on the basis of the piston velocity obtained by the previous calculation in each of calculation steps repeated, and the piston velocity calculation means 8 may calculate the piston velocity using the corrected thrust constant. As a concrete method for correcting the thrust constant, there is proposed a method of correcting the thrust constant of the linear motor using a table showing the relationships between the driving velocities of the motor and the thrust constants thereof, which are obtained from test values.

Second Embodiment

Figure 4:
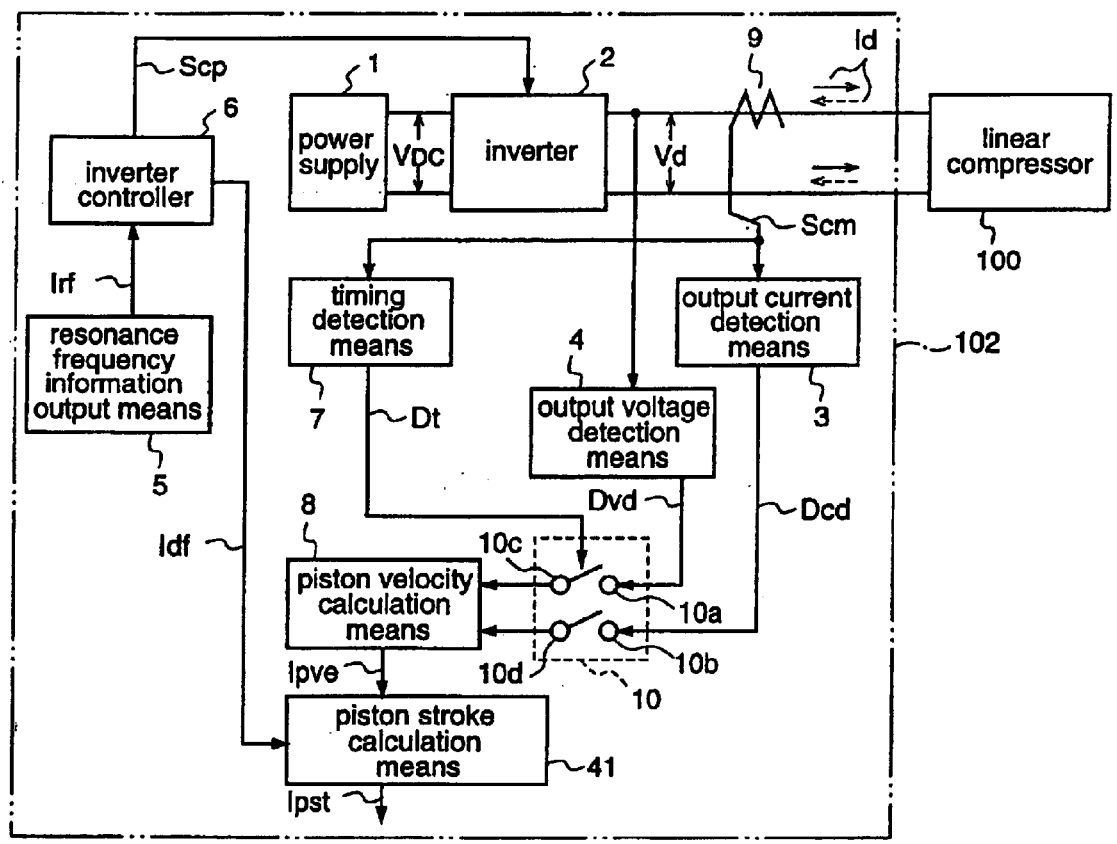
FIG. 4 is a block diagram for explaining a linear compressor driving apparatus according to a second embodiment of the present invention.

FIG. 4 is a block diagram for explaining a linear compressor driving apparatus according to a second embodiment of the present invention.

A linear compressor driving apparatus 102 according to the second embodiment is provided with, in addition to the linear compressor driving apparatus 101 according to the first embodiment, a piston stroke calculation means 41 which calculates the stroke of the piston reciprocating motion on the basis of the crest value v0 of the piston velocity that is obtained by the piston velocity calculation means 8 and the inverter driving frequency Fd that is determined by the inverter controller 6. The piston stroke calculation means 41 outputs piston stroke information Ipst indicating the piston stroke. The inverter controller 6 according to this second embodiment adjusts the pulse width of the PWM signal Scp for switching the inverter 2 on the basis of the resonance frequency information Irf, and the inverter controller 6 outputs the pulse width adjusted PWM signal Scp as an inverter driving control signal and. Furthermore, the inverter controller 6 outputs information (inverter driving frequency information) Idf indicating the output voltage of the inverter 2 and the frequency of the output voltage of the inverter 2, which are determined according to the pulse width of the PWM signal Scp, as the inverter driving frequency Fd, to the piston stroke calculation means 41. Ideally, the inverter driving frequency Fd matches the resonance frequency information Fr. Further, in this second embodiment, the piston stroke calculation means 41 is constituted by software. However, the piston stroke calculation means 41 may be constituted by hardware.

Next, the operation of the linear compressor driving apparatus 102 according to the second embodiment will be described.

Since the operations of the components of the linear compressor driving apparatus 102 according to this second embodiment, except for the inverter controller 6 and the piston stroke calculation means 41, are identical to those already described for the linear compressor driving apparatus 101 according to the first embodiment, the operations of the inverter controller 6 and the piston stroke calculation means will be mainly described hereinafter.

The position of the piston 72 that reciprocates in the linear compressor 100 is expressed by a sinusoidal function in which time is a variable, as the piston 72 is subjected to the pressure of the compressed cooling medium gas. Accordingly, assuming that the angular velocity of piston reciprocating motion is ω[rad/sec], the maximum amplitude of piston displacement is xm[m], and the piston displacement relative to the piston amplitude center position Pav (refer to FIG. 9) (i.e., the distance between the point where the piston is positioned at time t and the piston amplitude center position) is x(t)[m], the piston displacement x(t) is represented by the following formula (7), with time t[sec] being a variable.

$$x(t) = x_m \times \sin \omega \cdot t \quad (7)$$

Further, the piston velocity is also expressed by a sinusoidal function in which time is a variable. Accordingly, like the piston displacement, assuming that the angular velocity of the piston reciprocating motion is ω[rad/sec], the maximum amplitude of the piston velocity is vm[m/s] and the piston instantaneous velocity (the piston velocity at time t) is v(t)[m/s], the piston instantaneous velocity v(t) is represented by a sinusoidal function in which time t[sec] is a variable, as shown by the following formula (8).

$$v(t) = v_m \times \sin \omega \cdot t \quad (8)$$

Further, since the piston displacement x(t) is an integrated value of the piston velocity v(t), the following formula (9) is derived from formula (8) as a functional equation indicating the piston displacement with time being a variable.

$$x(t) = \int v(t) dt \quad (9)$$
$$= \frac{v_m}{\omega} \times (-\sin \omega \cdot t)$$

Then, the piston displacement x(t) is erased from formulae (7) and (9), whereby the maximum amplitude xm of the piston displacement can be expressed by using the maximum amplitude vm of the piston velocity, as xm=−vm/ω.

Accordingly, the maximum amplitude xm[m] of the piston displacement can be obtained by dividing the maximum amplitude vm[m/s] of the piston velocity by the operating angular velocity ω[rad/sec].

That is, in the inverter controller 6, the pulse width of the PWM signal Scp for switching the inverter 2 is adjusted on the basis of the resonance frequency information Irf, and the pulse width adjusted PWM signal Scp is output to the inverter 2 as an inverter driving control signal. Further, the information (inverter driving frequency information) Idf indicating the output voltage of the inverter 2 and the frequency of the output voltage of the inverter 2, which are determined according to the pulse width of the PWM signal Scp, is output as the inverter driving frequency Fd to the piston stroke calculation means 41.

Then, upon receipt of the piston velocity information Ipve outputted from the piston velocity calculation means 8 and the inverter driving frequency information Idf outputted from the inverter controller 6, the piston stroke calculation means 41 performs arithmetic processing in which the maximum amplitude vm[m/s] of the piston velocity, which is indicated by the piston velocity information Ipve, is divided by the angular velocity ω[rad/sec] of the piston reciprocating motion. Thereby, the maximum amplitude xm[m] of the piston displacement is calculated. The angular velocity ω[rad/sec] of the piston reciprocating motion can be obtained by multiplying the output voltage of the inverter 2 and the frequency Fd[Hz] of the output voltage of the inverter 2, which are indicated by the inverter driving frequency information Idf, with 2π.

Then, the piston stroke calculation means 41 outputs the piston stroke information Ipst indicating the piston stroke in the piston reciprocating motion (double the amplitude maximum value xm) as information indicating the maximum amplitude xm[m] of the piston displacement, which is obtained in the above-described arithmetic processing.

As described above, the linear compressor driving apparatus 102 according to the second embodiment includes, in addition to the components of the linear compressor driving apparatus 101 according to the first embodiment, the piston stroke calculation means 41 for calculating the piston stroke on the basis of the crest value vm of the piston velocity obtained by the piston velocity calculation means 8 and the inverter driving frequency Fd which is determined from the resonance frequency Fr of the linear compressor. Therefore, the risk of collision between the piston and the cylinder head in the linear compressor can be judged on the basis of the piston stroke.

Figure 9:
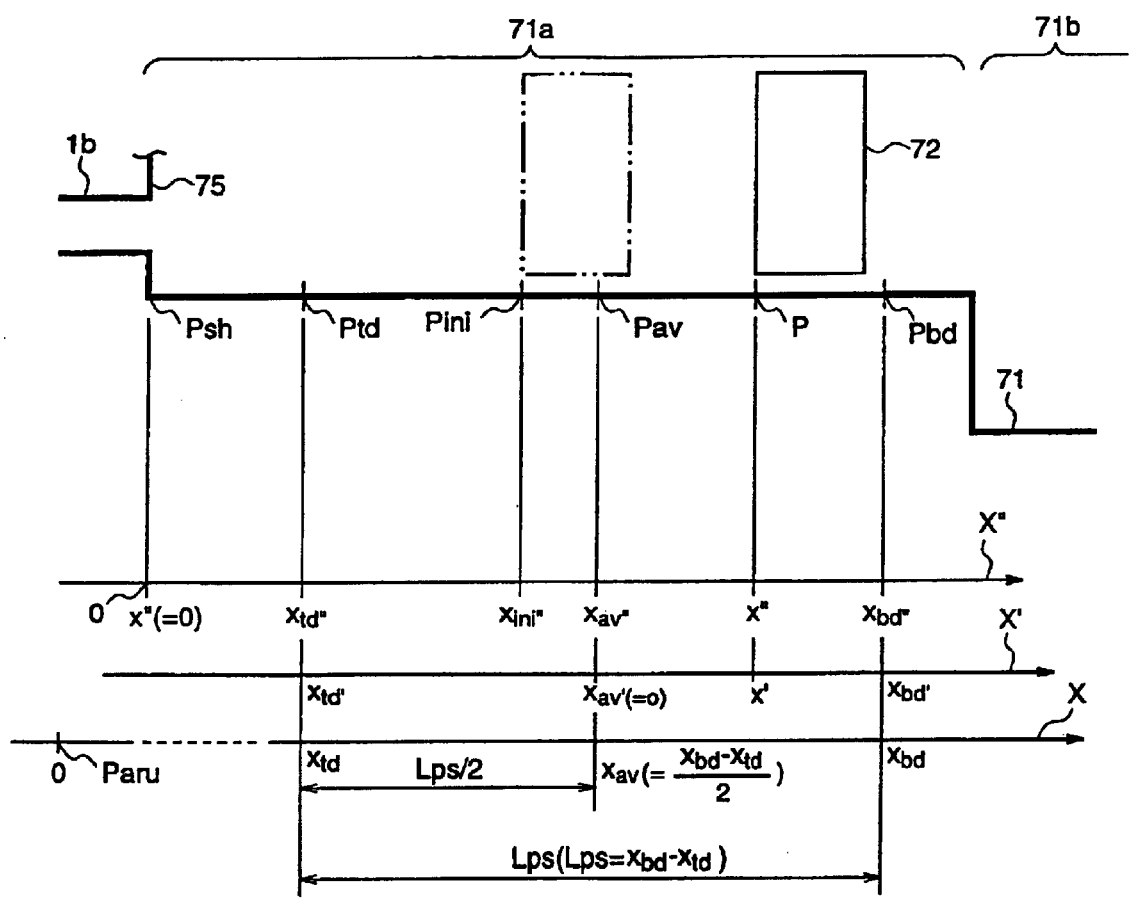
FIG. 9 is a diagram schematically illustrating a piston position in a cylinder of the linear compressor.

While the linear compressor driving apparatus 102 according to the second embodiment is constituted by adding the piston stroke calculation means 41 to the linear compressor driving apparatus 101 according to the first embodiment, the linear compressor driving apparatus 102 may further include a bottom dead point position information output means for outputting information corresponding to the distance from the cylinder head position Psh to the piston bottom dead point position Pbd (i.e., the displacement xbd" in the third coordinate system X" shown in FIG. 9) as information indicating the piston bottom dead point position Pbd (refer to FIG. 9). The linear compressor driving apparatus 102 according to the second embodiment may further include an arithmetic means for performing four fundamental operations of arithmetic on the basis of the piston stroke information and the bottom dead point position information.

In this case, the arithmetic means can derive the piston displacement xav" in the third coordinate system X" indicating the piston amplitude center position pav (refer to FIG. 9), by subtracting a value (Lps/2) that is half the stroke value indicated by the piston stroke information from the value xbd" indicated by the bottom dead point position information in the third coordinate system X" (refer to FIG. 9). Furthermore, in this case, the linear compressor driving efficiency can be further enhanced by controlling the linear compressor so that the piston amplitude center position matches a position where the maximum efficiency of the linear motor can be achieved.

Further, the piston displacement xtd" on the third coordinate system X" indicating the piston top dead point position Ptd (refer to FIG. 9) can be derived by subtracting the piston stroke value (Lps) itself, which is indicated by the piston stroke information, from the value xbd" indicated by the bottom dead point position information in the third coordinate system X" (refer to FIG. 9), with the arithmetic means. Since this displacement xtd" is the distance from the cylinder head to the piston top dead point position, the possibility of collision of the piston with the cylinder head can be judged from the displacement and, therefore, it is useful in preventing collision of the piston with the cylinder head.

As a concrete configuration of the bottom dead point position information output means, for example, there is a bottom dead point position sensor which measures, as a piston bottom point position, a position where a predetermined measurement point that is set on the piston is farthest apart from the cylinder head, and outputs the measured value as information indicating the distance from the cylinder head position Psh to the piston bottom dead point position Pbd. Further, the bottom dead point position sensor may be a position sensor having a short range of measurement which can detect only the piston bottom dead point position, or the bottom dead point position sensor may be a simple position sensor which detects whether or not the piston measurement point advances from the cylinder head beyond a predetermined position.

Furthermore, the bottom dead point position information output means may output bottom dead point position information indicating a piston bottom dead point position in the piston reciprocating motion with reference to the cylinder head position psh on the basis of the output voltage of the inverter 2 and the frequency of the output current of the inverter 2, which are determined by the inverter controller 6, and the maximum amplitude of the piston velocity, which is calculated by the piston velocity calculation means 8.

Moreover, the bottom dead point position information output means may output, as the bottom dead point position information, position information indicating the piston bottom dead point with reference to the piston neutral position on the basis of the output voltage of the inverter 2 and the frequency of the output current of the inverter 2, which are determined by the inverter controller 6, the maximum amplitude of the piston velocity which is calculated by the piston velocity calculation means 8, the weight of the movable member performing the piston reciprocating motion, and the spring constant of the elastic member. A concrete configuration of the bottom dead point position information output means in this case will be later described as a bottom dead point position calculation means 51 (refer to FIG. 5) according to a third embodiment of the present invention.

Furthermore, the linear compressor driving apparatus may include, in addition to the linear compressor driving apparatus 102 according to the second embodiment, a top dead point position output means for outputting information corresponding to the distance from the cylinder head position Psh to the piston top dead point position Ptd (the displacement xtd" in the third coordinate system X" shown in FIG. 9), as information indicating the piston top dead point position Ptd (refer to FIG. 9), and an arithmetic means for performing four fundamental operations of arithmetic on the basis of the piston stroke information and the top dead point position information.

In this case, the arithmetic means can derive the piston displacement xav" in the third coordinate system X" indicating the piston amplitude center position pav (refer to FIG. 9), by adding a value (Lps/2) that is half the stroke value indicated by the piston stroke information to the value xbd" indicated by the bottom dead point position information (refer to FIG. 9).

Further, the displacement xpd" in the third coordinate system X" indicating the piston bottom dead point position Pbd (refer to FIG. 9) can be derived by adding the piston stroke value (Lps), which is indicated by the piston stroke information, to the value xtd" indicated by the top dead point position information (refer to FIG. 9) with the arithmetic means. Since this displacement xbd" is the distance from the cylinder head position Psh to the piston bottom dead point position Pbd, the displacement xbd" is useful in drive control for the linear compressor so as to prevent the resonance spring from being deformed beyond its destruction limit.

As a concrete configuration of the top dead point position information output means, for example, there is a top dead point position sensor which measures, as a piston top point position, a position where a predetermined measurement point that is set on the piston is closest to the cylinder head, and outputs the measured value as information indicating the distance from the cylinder head position Psh to the piston top dead point position Ptd. Further, the top dead point position sensor may be a position sensor having a short range of measurement, which can detect only the piston top dead point position, or the top dead point position sensor may be a simple position sensor which merely detects whether or not the measurement point of the piston approaches the cylinder head beyond a predetermined position.

Furthermore, the linear compressor driving apparatus may include, in addition to the linear compressor driving apparatus 102 according to the second embodiment, an amplitude center position information calculation means for outputting the distance from the cylinder head position Psh to the piston amplitude center position pav (the displacement xav" in the third coordinate system X" shown in FIG. 9) as information indicating the piston amplitude center position Pav (refer to FIG. 9), and an arithmetic means for performing four fundamental operations of arithmetic on the basis of the piston stroke information and the amplitude center position information.

In this case, the arithmetic means can derive the displacement xbd" in the third coordinate system X" indicating the piston bottom dead point position Pbd (refer to FIG. 9) by adding a value (Lps/2) that is half the stroke value indicated by the piston stroke information to the value xav" indicated by the amplitude center position information (refer to FIG. 9).

Further, conversely, the arithmetic means can derive the displacement xtd" in the third coordinate system X" indicating the piston top dead point position Ptd (refer to FIG. 9) by subtracting a value (Lps/2) that is half the stroke value indicated by the piston stroke information from the value xav" indicated by the amplitude center position information (refer to FIG. 9).

As a method of calculating the information indicating the amplitude center position (the distance from the cylinder head position Psh to the piston amplitude center position Pav), there is a method of calculating a force caused by the gas pressure applied to the piston, on the basis of the pressure difference between the discharge pressure and the inlet pressure of the linear compressor, and the Bohr cross-section of the piston, so as to calculate the piston amplitude center position.

In the above-described amplitude center position information calculating method using the pressure difference, a force caused by the gas pressure applied to the piston may be calculated by using not only the pressure difference but also the linear compressor driving frequency ω, whereby the distance information as the piston amplitude center position information can be calculated with higher accuracy.

Moreover, while in this second embodiment, the thrust constant of the linear motor to be used in the arithmetic processing by the piston velocity calculation means is a specific value that is previously measured, the thrust constant may be subjected to correction according to the piston amplitude center position.

That is, actually, the magnetic flux density between the coil and the magnet in the linear motor is increased or decreased according to the positional relationship between the coil and the magnet. This is because the magnetic field caused by the current that is applied to the linear motor increases or decreases the magnetic field of the magnet.

So, the amplitude center position information calculation means may correct the value of the thrust constant on the basis of the amplitude center position information which has been obtained in the previous calculation step, in each of the calculation steps to be repeated on the basis of the amplitude center position information, and thus, the amplitude center position information calculation means may calculate the amplitude center position information on the basis of the corrected thrust constant.

Further the piston stroke calculation means 8 may repeatedly calculate the piston stroke information on the basis of the maximum amplitude of the piston velocity, and correct the value of the thrust constant of the linear motor, which value varies according to the piston position, on the basis of the piston stroke information calculated in the previous calculation step, in each of the calculation steps to be repeated, and further, calculate the piston stroke information on the basis of the corrected thrust constant. In this case, a more accurate value can be derived as the piston stroke.

Third Embodiment

Figure 5:
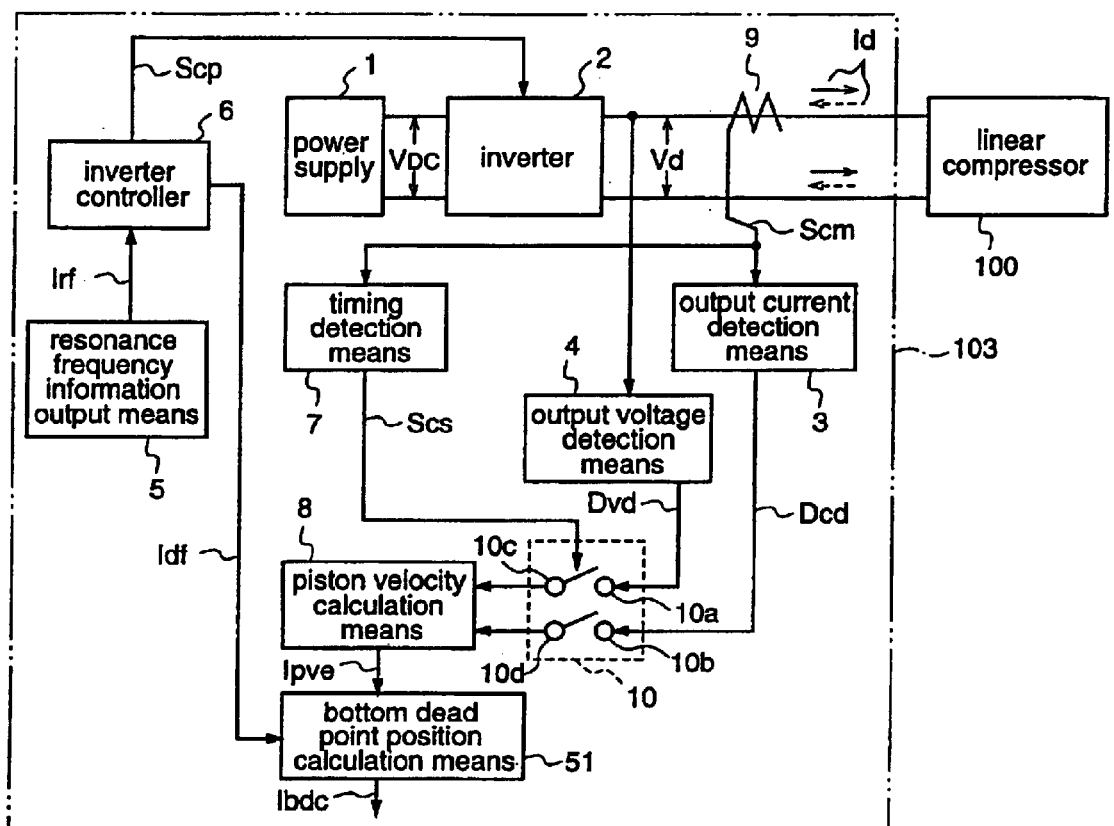
FIG. 5 is a block diagram for explaining a linear compressor driving apparatus according to a third embodiment of the present invention.
Figure 10:
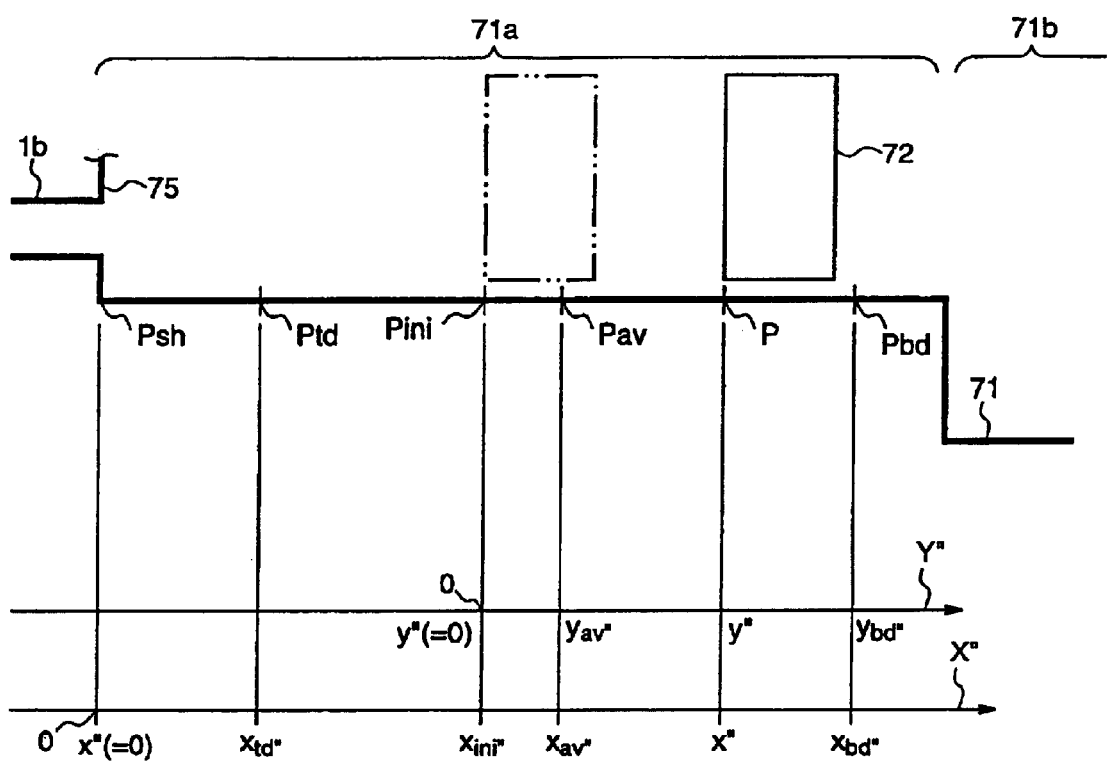
FIG. 10 is a diagram for explaining operations of the linear compressor driving apparatus according to the third and fourth embodiments.

FIG. 5 is a block diagram for explaining a linear compressor driving apparatus 103 according to a third embodiment of the present invention. FIG. 10 illustrates a coordinate system Y" showing a piston position relative to a piston neutral position Pini, in contrast with the coordinate system X" (the third coordinate system shown in FIG. 9) indicating a piston position relative to a cylinder header position Psh.

The linear compressor driving apparatus 103 according to the third embodiment includes, in addition to the components of the linear compressor driving apparatus 101 according to the first embodiment, a bottom dead point position calculation means 51 which calculates a displacement ybd" of a piston bottom dead point position Pbd relative to a piston neutral position Pini (refer to FIG. 10), as distance information between the piston neutral position Pini and the piston bottom dead point position Pbd, on the basis of the crest value vm of the piston velocity obtained by the piston velocity calculation means 8 and the inverter driving frequency Fd determined by the inverter controller 6. The bottom dead point position calculation means 51 outputs the distance information between the piston neutral position Pini and the piston bottom dead point position Pbd as piston bottom dead point position information Ibdc. The piston neutral position Pini is a position of the piston 72 on the piston axis when the support spring is not deformed. Further, the inverter controller 6 according to this third embodiment adjusts the pulse width of the PWM signal Scp for switching the inverter 2 on the basis of the resonance frequency information Irf, and outputs the pulse width adjusted PWM signal Scp as an inverter driving control signal to the inverter 2. Furthermore, the inverter controller 6 outputs information (inverter driving frequency information) Idf indicating the output voltage of the inverter 2 and the frequency of the output current of the inverter 2, which are determined according to the pulse width of the PWM signal Scp, as the inverter driving frequency Fd, to the bottom dead point position calculation means 51.

Ideally, the inverter driving frequency Fd matches the resonance frequency information Fr. Further, in this third embodiment, the bottom dead point position calculation means 51 is constituted by software. However, the bottom dead point position calculation means 51 may be constituted by hardware.

Next, the operation of the linear compressor driving apparatus 103 according to the third embodiment will be described.

Since the operations of the components of the linear compressor driving apparatus 103 according to this third embodiment, except for the inverter controller 6 and the bottom dead point position calculation means 51, are identical to those already described for the linear compressor driving apparatus 101 according to the first embodiment, the operations of the inverter controller 6 and the bottom dead point position calculation means 51 will be mainly described hereinafter.

As a motion equation relating to the piston reciprocating motion of the linear motor 82 of the linear compressor 103, the following equation (10) holds.

$$m \times a + k + y'' = \alpha \times I - \beta(P_{(t)} - P_s) \quad (10)$$

In equation (10), m is the total mass [kg] of the reciprocating movable member, and a is the instantaneous acceleration [m/s$^2$] of the reciprocating movable member. Further, k is the spring constant [N/m] of the support spring that is incorporated into the linear compressor, y" is the displacement [m] of the movable member with respect to the position (piston neutral position) Pini of the movable member in the state where the spring is not deformed, α is the thrust constant [N/A] of the linear motor, I is the measured value [A] of the driving current applied to the linear motor, β is the Bohr cross-section [m·m] of the piston, P(t) is the pressure [Pa] in the compression chamber, and Ps is the gas pressure (inlet pressure) [Pa] at the piston rear side.

When the linear compressor 103 is being driven in the resonance state of the piston reciprocating motion, the pressure in the compression chamber becomes equal to the inlet pressure when the piston reaches the bottom dead point position. Therefore, at this point of time, the second term (i.e., $\beta(P_{(t)} - P_s)$) on the right side of motion equation (10) indicating the piston motion becomes zero.

Further, as shown in FIG. 3, when the bottom dead point position, i.e., the piston displacement, becomes maximum, the acceleration also becomes maximum, whereby the driving current Id of the linear motor becomes zero.

Accordingly, the acceleration a in the first term on the left side of equation (10) becomes the maximum acceleration value (a=am), the variable y" in the second term on the left side becomes the displacement of the bottom dead point position (y"=ybd"), and the first term on the right side and the second term on the right side become zero (I=0), whereby equation (11) holds instead of equation (10).

$$m \times a_m + k \times y_{bd''} = 0 \quad (11)$$

In equation (11), am is the maximum value of piston acceleration [m/s$^2$], and ybd" is the displacement [m] of the bottom dead point position which is indicated to be relative to the piston neutral position Pini.

Accordingly, when the maximum value am[m/s$^2$] of piston acceleration is determined, the displacement ybd"[m] indicating the bottom dead point position (refer to FIG. 10) can be determined from equation (11).

Next, how to determine the maximum value am[m/s$^2$] of piston acceleration will be described.

The piston acceleration a is expressed by a sinusoidal function in which time t is a variable, like the piston displacement x(t) and the piston velocity v(t) as described above for the second embodiment.

To be specific, assuming that the angular velocity of piston motion is ω[rad/sec], the maximum amplitude value of piston acceleration is am[m/s$^2$], and the instantaneous value of piston acceleration is a(t)[m/s$^2$], since acceleration is a differentiated value of velocity, the piston acceleration is expressed by equation (12) with time t[sec] being a variable.

$$a_{(t)} = a_m \times \cos\omega \cdot t \qquad (12)$$
$$= (v_{(t)})'$$
$$= \omega \times v_m \times \cos\omega \cdot t$$

Since it is evident from equation (12) that the relationship am=vm×ω holds, the maximum value am[m/s$^2$] of piston acceleration is obtained by the product of the maximum amplitude value vm[m/s] of the piston velocity and the angular velocity ω[rad/sec] of the piston motion.

The inverter controller 6 according to the third embodiment adjusts the pulse width of the PWM signal Scp for switching the inverter 2 on the basis of the resonance frequency information Irf, and outputs the pulse width adjusted PWM signal Scp as an inverter driving control signal to the inverter 2. Furthermore, the inverter controller 6 outputs the information (inverter driving frequency information) Idf indicating the output voltage of the inverter 2 and the frequency of the output current of the inverter 2, which are determined according to the pulse width of the PWM signal Scp, as the inverter driving frequency Fd, to the bottom dead point position calculation means 51.

Then, in the linear compressor driving apparatus 103 according to the third embodiment, the bottom dead point position calculation means 51 receives the piston velocity information Ipve outputted from the piston velocity calculation means 8 and the inverter driving frequency information Idf outputted from the inverter controller 6, and performs multiplication of the maximum amplitude vm[m/s] of the piston velocity indicated by the piston velocity information Ipve, and the operating angular velocity ω[rad/sec] (a value obtained by multiplying the inverter driving frequency Fd[Hz] indicated by the inverter driving frequency information Idf, with 2π), thereby obtaining the maximum amplitude am[m/s$^2$] of acceleration. Further, the bottom dead point position calculation means 51 performs multiplication of the acceleration maximum amplitude am[m/s$^2$] and the total mass m[kg] of the movable member, and performs division for diving a value obtained by the multiplication with the spring constant k[N/m] of the support spring of the linear compressor 100, thereby obtaining the displacement ybd"[m] indicating the bottom dead point position Pbd (refer to FIG. 10). Then, the bottom dead point position calculation means 51 outputs information indicating the displacement ybd"[m] as bottom dead point position information Ibdc.

As described above, the linear compressor driving apparatus 103 according to the third embodiment is provided with the bottom dead point position calculation means 51 for calculating a value ybd"[m] indicating the distance between the piston neutral position Pini and the piston bottom dead point position Pbd, as a piston displacement indicating the piston bottom dead point position Pbd, on the basis of the maximum amplitude vm[m/s] of the piston velocity obtained by the piston velocity calculation means 8, and the inverter driving frequency Fd determined from the resonance frequency Fr of the linear compressor, whereby the amount of flexure of the resonance spring can be grasped by the piston bottom dead point position information. The amount of flexure of the resonance spring is useful in drive-controlling the linear compressor so as to prevent the resonance spring from being deformed beyond the destruction limit.

Fourth Embodiment

Figure 6:
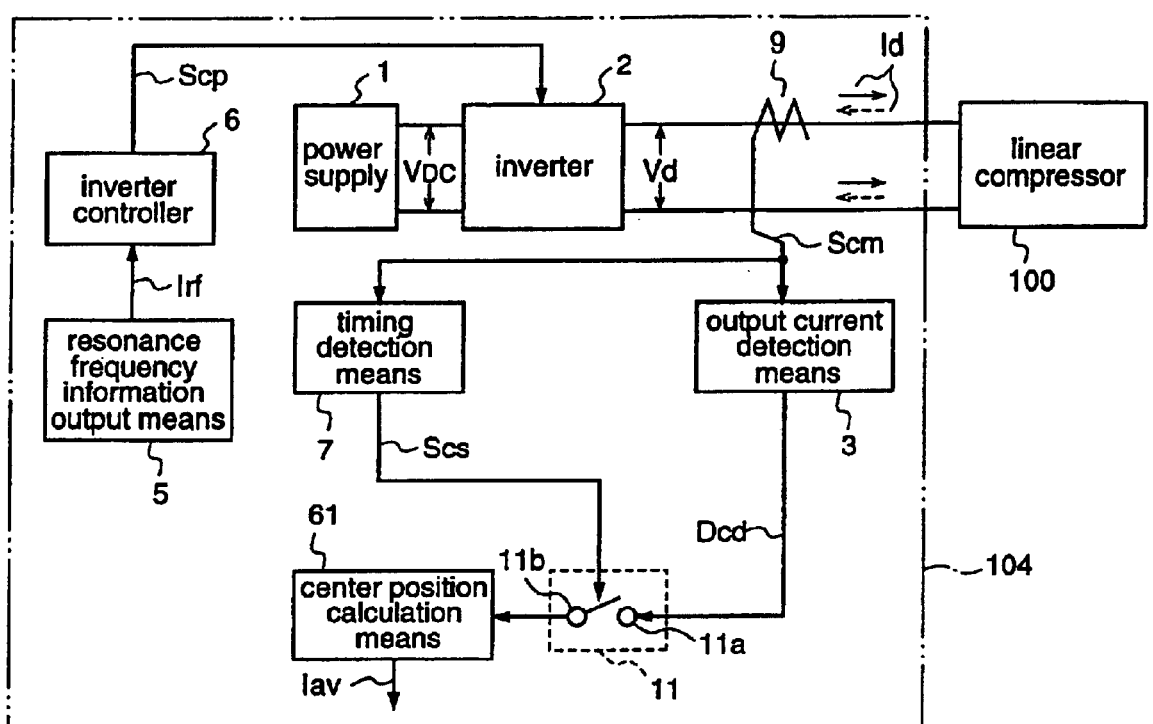
FIG. 6 is a block diagram for explaining a linear compressor driving apparatus according to a fourth embodiment of the present invention.

FIG. 6 is a block diagram for explaining a linear compressor driving apparatus according to a fourth embodiment of the present invention.

A linear compressor driving apparatus 104 according to the fourth embodiment is provided with a power supply 1, an inverter 2, a current sensor 9, an output current detection means 3, a resonance frequency information output means 5, an inverter controller 6, and a timing detection means 7, like the linear compressor 101 according to the first embodiment. Further, the linear compressor driving apparatus 104 according to the fourth embodiment is provided with a center position calculation means 61 for calculating a displacement yav" of the piston amplitude center position Pav with respect to the piston neutral position Pini (refer to FIG. 10), as information indicating a center position Pav of piston reciprocating motion (piston amplitude center position) Pav, on the basis of a detection result (driving current detection signal) Dcd outputted from the output current detection means 3. The linear compressor driving apparatus 104 also includes an open/close switch 11 for controlling the supply and supply stop of the driving current detection signal Dcd to the center position calculation means 61 according to a switch control signal Scs outputted from the timing detection means 7.

The open/close switch 11 has an input side node 11a to which the driving current detection signal Dcd is applied from the output current detection means 3, and an output side node 11b from which the driving current detection signal Dcd is output to the center position calculation means 61. The open/close switch 11 connects or disconnects the input side node 11a to/from the output side node 11b on the basis of the switch control signal Scs, which is a detection result from the timing detection means 7.

In this fourth embodiment, the center position calculation means 61 is implemented by software. However, the center position calculation means 61 may be constituted by hardware.

Next, the operation of the linear compressor driving apparatus 104 will be described.

According to this fourth embodiment, like the first embodiment, in the linear compressor 100, the linear motor is driven with the AC voltage Vd that is supplied from the inverter 2, whereby the piston reciprocates. Further, since the frequency of the AC current Vd applied to the linear compressor matches the resonance frequency Fr of the piston reciprocating motion, the linear compressor 100 is driven in the resonance state of the piston reciprocating motion.

At this time, in the output current detection means 3, the inverter output current, i.e., the driving current Id of the linear compressor 100, is detected on the basis of the current monitoring output Scm from the current sensor 9, and a detection result (driving current detection signal) Dcd is output to the input side node 11a of the open/close switch 11.

Further, in the timing detection means 7, a phase timing at which the phase of the inverter driving current Id becomes at least one of 90° and 270° is detected on the basis of the current monitoring output Scm from the current sensor 9, and a switch control signal Scs for connecting the input side node 11a and the output side node 11b of the open/close switch 11 is output to the open/close switch 11 at this phase timing.

In the open/close switch 11, upon receipt of the switch control signal Scs, the input side node 11a and the output side node 11b are connected at the phase timing, whereby a value (instantaneous value) I1 of the driving current Id at the phase timing is output to the center position calculation means 61.

Then, in the center position calculation means 61, a displacement yav"[m] of the piston amplitude center position Pav relative to the piston neutral position Pini is calculated from the following formula (13) on the basis of the instantaneous value Im of the driving current at the phase timing, and information indicating the displacement yav" is output as amplitude center position information Iav.

That is, as described in the third embodiment, as for the piston reciprocating motion by the linear motor of the linear compressor 100, the above-described equation (10) holds as a motion equation.

With the phase timing at which the phase of the driving current applied to the linear compressor becomes at least one of 90° and 270° in such piston reciprocating motion, the piston acceleration a[m/s$^2$] becomes zero, and the displacement y"[m] of the piston position P relative to the piston neutral position Pini matches the displacement yav" of the piston amplitude center position Pav relative to the piston neutral position Pini, and further, the driving current I[A] takes the maximum value Im.

In this fourth embodiment, the linear compressor 100 is designed so that the inlet valve of the linear compressor 100 is opened at the above-mentioned phase timing, and the pressure P(t)[Pa] in the compression chamber becomes equal to the inlet pressure Ps[Pa]. Therefore, the following equation (13) holds instead of equation (10).

$$k \times y_{av.} = a \times I_m \qquad (13)$$

From equation (13), the displacement yav"[m] of the piston amplitude center position Pav can be obtained by arithmetic processing in which the product of the maximum amplitude Im[A] of the input current to the linear compressor and the thrust constant α [N/A] of the linear motor is divided by the spring constant k[N/m] of the support spring of the linear compressor.

As described above, the linear compressor driving apparatus 104 according to the fourth embodiment is provided with the center position calculation means 61 instead of the output voltage detection means 4 and the piston velocity detection means 8 in the linear compressor driving apparatus 101 according to the first embodiment. The center position calculation means 61 calculates the displacement yav" indicating the piston amplitude center position on the basis of the instantaneous value Im[A] of the driving current at the phase timing in which the phase of the linear compressor driving current Id is at least one of 90° and 270°. Therefore, the displacement yav" of the center position Pav of piston reciprocating motion with respect to the piston neutral position Pini can be accurately obtained by relatively simple arithmetic processing including only multiplication and division, whereby detection of the center position Pav of piston reciprocating motion can be easily carried out with high accuracy.

Furthermore, in this fourth embodiment, the linear compressor driving apparatus 104 detects the instantaneous value Im of the inverter driving current Id with the phase timing at which the phase of the inverter driving current Id becomes at least one of 90° and 270°, and calculates the piston amplitude center position information on the basis of the instantaneous value Im. However, the linear compressor driving apparatus 104 may calculate the piston amplitude center position information on the basis of the instantaneous value Im of the inverter driving current Id, the pressure of the cooling medium gas discharged from the linear compressor, and the pressure of the cooling medium gas drawn into the linear compressor.

In this case, the linear compressor driving apparatus 104 according to the fourth embodiment is further provided with a discharge pressure detection means for detecting the pressure of the cooling medium gas discharged from the linear compressor, and an inlet pressure detection means for detecting the pressure of the cooling medium gas drawn into the linear compressor. Further, the center position information calculation means 61 calculates an action force in the direction of the piston reciprocating motion, which force acts on the piston from the cooling medium gas, on the basis of a pressure difference between the discharge pressure and the inlet pressure. Still further, the center position information calculation means 61 calculates position information indicating the piston center position relative to the piston position in which the pressure difference becomes zero as the center position information.

Furthermore, the center position information calculation means 61 may calculate an action force in the direction of the piston reciprocating motion, which acts on the piston from the cooling medium gas, on the basis of a pressure difference between the discharge pressure and the inlet pressure and the resonance frequency indicated by the resonance frequency information outputted from the resonance frequency information output means 5. The center position information calculation means 61 may also calculate position information indicating the piston center position relative to the piston position in which the pressure difference becomes zero as the center position information.

As described above, the linear compressor driving apparatus according to the present invention can accurately detect the stroke and top clearance of the piston of the linear compressor with relatively simple arithmetic processing without having to use a position sensor. Therefore, the linear compressor driving apparatus is very useful as a driving apparatus for a linear compressor in which the stroke and top clearance of a piston vary with variations of loads, and the linear compressor driving apparatus is used for a refrigerating compressor.

What is claimed is:

1. A linear compressor driving apparatus for driving a linear compressor which has a piston and a linear motor for making the piston reciprocate and which generates a compressed gas by the reciprocating motion of the piston with an AC voltage being applied to the linear motor, said apparatus comprising:

an inverter for outputting an AC voltage and an AC current to the linear motor;

a resonance frequency information output means for outputting resonance frequency information which indicates a resonance frequency of the reciprocating motion of the piston;

a voltage detection means for detecting an output voltage of said inverter to output a voltage detection signal;

a current detection means for detecting an output current of said inverter to output a current detection signal;

an inverter controller for controlling said inverter on the basis of the resonance frequency information so that said inverter outputs a sinusoidal-wave-shaped output voltage and a sinusoidal-wave-shaped output current whose frequencies each match the resonance frequency of the piston reciprocating motion;

a timing detection means for detecting, as a specific phase timing, a phase timing at which a differentiated value of the output current of said inverter becomes zero; and a piston velocity calculation means for receiving the voltage detection signal and the current detection signal, and calculating a maximum amplitude of a piston velocity in the piston reciprocating motion on the basis of instantaneous values of the output voltage and the output current output from said inverter at the specific phase timing.

2. A linear compressor driving apparatus as defined in claim 1, wherein said timing detection means detects, as the specific phase timing, a phase timing at which the amplitude of the output current output from said inverter becomes maximum.

3. A linear compressor driving apparatus as defined in claim 1, wherein said piston velocity calculation means performs a temperature correction process on a thrust constant of the linear motor, the value of thrust constant varying with variations in temperature, and calculates a maximum amplitude of the piston velocity on the basis of the temperature-corrected thrust constant value, the instantaneous current value, the instantaneous voltage value, and an internal resistance value of the linear motor.

4. A linear compressor driving apparatus as defined in claim 1, wherein said piston velocity calculation means performs a temperature correction process on an internal resistance value of the linear motor, the internal resistance value varying with variations in temperature, and calculates a maximum amplitude of the piston velocity on the basis of the temperature-corrected internal resistance value, the instantaneous values of the output voltage and output current of said inverter, and a thrust constant of the linear motor.

5. A linear compressor driving apparatus as defined in claim 1, wherein said piston velocity calculation means repeats a velocity calculation process for calculating a maximum amplitude of the piston velocity, and wherein, in each of the repeated velocity calculation processes, said piston velocity calculation means corrects a thrust constant of the linear motor, the value of the thrust constant varying with variations in the piston velocity, on the basis of a maximum amplitude of the piston velocity which is calculated in the previous velocity calculation process, and calculates a maximum amplitude of the piston velocity on the basis of the corrected thrust constant.

6. A linear compressor driving apparatus as defined in claim 1, wherein said timing detection means detects a phase timing at which the phase of the AC current output from said inverter becomes at least one of 90° and 270°, as the specific phase timing, on the basis of the current detection signal.

7. A linear compressor driving apparatus as defined in claim 6, wherein said inverter controller outputs an inverter driving control signal which drives and controls said inverter; and said timing detection means detects a phase timing at which a differentiated value of the output current output from said inverter becomes zero on the basis of the phase of the inverter driving control signal.

8. A linear compressor driving apparatus as defined in claim 7, wherein said timing detection means has a phase shift amount detector for detecting the amount of phase shift of the phase of the inverter driving control signal from the phase of the output current of said inverter, and detects a phase timing at which a differentiated value of the output current of said inverter becomes zero on the basis of the inverter driving control signal whose phase is corrected so that the amount of phase shift becomes zero.

9. A linear compressor driving apparatus as defined in claim 1, further including a bottom dead point position information calculation means for calculating bottom dead point position information, which indicates a piston bottom dead point position in the piston reciprocating motion, on the basis of the output voltage of said inverter and the frequency of the output current of said inverter, which are determined by said inverter controller, and the maximum amplitude of the piston velocity that is calculated by said piston velocity calculation means.

10. A linear compressor driving apparatus as defined in claim 9, wherein the linear compressor has an elastic member which applies a force to the piston so as to bring the piston back to a piston neutral position when the piston is displaced from the piston neutral position; and said bottom dead point position information calculation means calculates, as the bottom dead point position information, position information indicating the piston bottom dead point position relative to the piston neutral position on the basis of the output voltage of said inverter and the frequency of the output current of said inverter, which are determined by said inverter controller, the maximum amplitude of the piston velocity, which is calculated by said piston velocity calculation means, the weight of the movable member which performs the piston reciprocating motion in the linear compressor, and the spring constant of the elastic member.

11. A linear compressor driving apparatus as defined in claim 1, further including a stroke information calculation means for calculating piston stroke information which indicates a maximum amplitude of a piston displacement in the piston reciprocating motion on the basis of the output voltage of said inverter and the frequency of the output current of said inverter, which are determined by said inverter controller, and the maximum amplitude of the piston velocity that is calculated by said piston velocity calculation means.

12. A linear compressor driving apparatus as defined in claim 11, further including:

a top dead point position information detection sensor for detecting a piston top dead point position in the piston reciprocating motion to output top dead point position information indicating the detected piston top dead point position; and an arithmetic means for calculating center position information indicating a piston center position in the piston reciprocating motion by performing the four fundamental rules of arithmetic on the basis of the top dead point position information and the piston stroke information.

13. A linear compressor driving apparatus as defined in claim 11, further including:

a top dead point position information detection sensor for detecting a piston top dead point position in the piston reciprocating motion to output top dead point position information indicating the detected piston top dead point position; and an arithmetic means for calculating bottom dead point position information indicating a piston bottom dead point position in the piston reciprocating motion by performing the four fundamental rules of arithmetic on the basis of the top dead point position information and the piston stroke information.

14. A linear compressor driving apparatus as defined in claim 11, further including:

a bottom dead point position information detection sensor for detecting a piston bottom dead point position in the piston reciprocating motion; and an arithmetic means for calculating center position information indicating a piston center position in the piston reciprocating motion by performing the four fundamental rules of arithmetic on the basis of the bottom dead point position information and the piston stroke information.

15. A linear compressor driving apparatus as defined in claim 11, further including:

a bottom dead point position information detection sensor for detecting a piston bottom dead point position in the piston reciprocating motion to output bottom dead point position information indicating the detected piston bottom dead point position; and an arithmetic means for calculating top dead point position information indicating a piston top dead point position in the piston reciprocating motion by performing the four fundamental rules of arithmetic on the basis of the bottom dead point position information and the piston stroke information.

16. A linear compressor driving apparatus as defined in claim 11, further including:

a center position information calculation means for calculating center position information indicating a piston center position in the piston reciprocating motion on the basis of the output current output from said inverter; and an arithmetic means for calculating top dead point position information indicating a piston top dead point position in the piston reciprocating motion by performing the four fundamental rules of arithmetic on the basis of the center position information and the piston stroke information.

17. A linear compressor driving apparatus as defined in claim 11, further including:

a center position information calculation means for calculating center position information indicating a piston center position in the piston reciprocating motion on the basis of the output current output from said inverter; and an arithmetic means for calculating bottom deal point position information indicating a piston bottom dead point position in the piston reciprocating motion by performing the four fundamental rules of arithmetic on the basis of the center position information and the piston stroke information.

18. A linear compressor driving apparatus as defined in claim 11, wherein said piston stroke calculation means repeats a calculation process for calculating the piston stroke information on the basis of the maximum amplitude of the piston velocity, and wherein, in each of the repeated calculation processes, said piston stroke calculation means corrects a thrust constant of the linear motor, the value of the thrust constant varying with variations in the piston position, on the basis of the piston stroke information calculated in the previous calculation process, and calculates the piston stroke information on the basis of the corrected thrust constant.

19. A linear compressor driving apparatus as defined in claim 11, further including:

a bottom dead point position information calculation means for calculating bottom dead point position information, which indicates a piston bottom dead point position in the piston reciprocating motion, on the basis of the output voltage of said inverter and the frequency of the output current of said inverter, which are determined by said inverter controller, and the maximum amplitude of the piston velocity that is calculated by said piston velocity calculation means; and an arithmetic means for calculating center position information, which indicates a piston center position in the piston reciprocating motion by performing the four fundamental rules of arithmetic on the basis of the bottom dead point position information and the piston stroke information.

20. A linear compressor driving apparatus as defined in claim 19, wherein the linear compressor has an elastic member which applies a force to the piston so as to bring the piston back to a piston neutral position when the piston is displaced from the piston neutral position; and said bottom dead point position information calculation means calculates, as the bottom dead point position information, position information indicating the piston bottom dead point position relative to the piston neutral position on the basis of the output voltage of said inverter and the frequency of the output current of said inverter, which are determined by said inverter controller, the maximum amplitude of the piston velocity, which is calculated by said piston velocity calculation means, the weight of the movable member which performs the piston reciprocating motion in the linear compressor, and the spring constant of the elastic member.

21. A linear compressor driving apparatus as defined in claim 11, further including:

a bottom dead point position information calculation means for calculating bottom dead point position information which indicates a piston bottom dead point position in the piston reciprocating motion, on the basis of the output voltage of said inverter and the frequency of the output current of said inverter, which are determined by said inverter controller, and the maximum amplitude of the piston velocity which is calculated by said piston velocity calculation means; and an arithmetic means for calculating top dead point position information indicating a piston top dead point position in the piston reciprocating motion by performing the four fundamental rules of arithmetic on the basis of the bottom dead point position information and the piston stroke information.

22. A linear compressor driving apparatus as defined in claim 21, wherein the linear compressor has an elastic member which applies a force to the piston so as to bring the piston back to a piston neutral position when the piston is displaced from the piston neutral position; and said bottom dead point position information calculation means calculates, as the bottom dead point position information, position information indicating the piston bottom dead point position relative to the piston neutral position on the basis of the output voltage of said inverter and the frequency of the output current of said inverter, which are determined by said inverter controller, the maximum amplitude of the piston velocity, which is calculated by said piston velocity calculation means, the weight of the movable member which performs the piston reciprocating motion in the linear compressor, and the spring constant of the elastic member.

23. A linear compressor driving apparatus for driving a linear compressor which has a piston and a linear motor for reciprocating the piston and which generates a compressed gas by the reciprocating motion of the piston with an AC voltage being applied to the linear motor, said apparatus comprising:

an inverter for outputting an AC voltage and an AC current to the linear motor;

a resonance frequency information output means for outputting resonance frequency information that indicates a resonance frequency of the piston reciprocating motion;

a current detection means for detecting an output current of said inverter to output a current detection signal;

an inverter controller for controller said inverter on the basis of the resonance frequency information so that said inverter outputs a sinusoidal-wave-shaped output voltage and a sinusoidal-wave-shaped output current whose frequencies each match the resonance frequency of the piston reciprocating motion;

a timing detection means for detecting, as a specific phase timing, a phase timing at which a differentiated value of the output current of said inverter becomes zero; and a piston center position calculation means for calculating center position information indicating a piston center position in the piston reciprocating motion on the basis of an instantaneous value of the output current of said inverter at the specific phase timing with reference to a piston position where a pressure difference between the pressure of a cooling medium gas that is discharged from the linear compressor and the pressure of the cooling medium gas that is drawn into the linear compressor becomes zero.

24. A linear compressor driving apparatus as defined in claim 23, wherein the linear compressor has an elastic member which applies a force to the piston so as to bring the piston back to a piston neutral position when the piston is displaced from the piston neutral position; and said center position information calculation means calculates, as the center position information, position information indicating the piston center position relative to the piston neutral position on the basis of the maximum amplitude of the output current output from said inverter, the thrust constant of the linear motor, and the spring constant of the elastic member.

25. A linear compressor driving apparatus as defined in claim 23, further including:

a discharge pressure detection means for detecting the pressure of the cooling medium gas that is discharged from the linear compressor; and an inlet pressure detection means for detecting the pressure of the cooling medium gas that is drawn into the linear compressor;

wherein said center position information calculation means calculates an action force in the direction of the piston reciprocating motion, which force acts on the piston from the cooling medium gas, on the basis of the pressure difference between the discharge pressure and the inlet pressure, and then calculates, as the center position information, position information indicating the piston center position relative to the piston position where the pressure difference becomes zero on the basis of the calculated action force.

26. A linear compressor driving apparatus as defined in claim 25, wherein said center position information calculation means calculates an action force in the direction of the piston reciprocating motion, which force acts on the piston from the cooling medium gas, on the basis of the pressure difference between the discharge pressure and the inlet pressure and the resonance frequency indicated by the resonance frequency information, and then calculates, as the center position information, position information indicating the piston center position relative to the piston position where the pressure difference becomes zero on the basis of the calculated action force.

* * * * *

UNITED STATES PATENT AND TRADEMARK OFFICE
CERTIFICATE OF CORRECTION

| | | |
|---|---|---|
| PATENT NO. | : 6,753,665 B2 | Page 1 of 1 |
| APPLICATION NO. | : 10/333268 | |
| DATED | : June 22, 2004 | |
| INVENTOR(S) | : Mitsuo Ueda et al. | |

It is certified that error appears in the above-identified patent and that said Letters Patent is hereby corrected as shown below:

In item 56,

Please replace "5,342,176 08/1994 Redlich 318/687" with --5,342,176 08/1994 Redlich 417/212--.
Please add --4,698,576 10/1987 Maresca 318/687--.
Please delete "5,342,576 8/1994 Whitehead 417/212".

Signed and Sealed this

Twenty-sixth Day of December, 2006

JON W. DUDAS
*Director of the United States Patent and Trademark Office*